US009622617B2

(12) United States Patent
Barreto

(10) Patent No.: US 9,622,617 B2
(45) Date of Patent: Apr. 18, 2017

(54) BARBEQUE GRILL

(71) Applicant: Aurelio F Barreto, Corona, CA (US)

(72) Inventor: Aurelio F Barreto, Corona, CA (US)

( * ) Notice: Subject to any disclaimer, the term of this patent is extended or adjusted under 35 U.S.C. 154(b) by 444 days.

(21) Appl. No.: 14/204,566

(22) Filed: Mar. 11, 2014

(65) Prior Publication Data

US 2014/0261378 A1 Sep. 18, 2014

Related U.S. Application Data

(60) Provisional application No. 61/790,922, filed on Mar. 15, 2013.

(51) Int. Cl.
*A47J 37/07* (2006.01)
(52) U.S. Cl.
CPC ........... *A47J 37/0713* (2013.01); *A47J 37/07* (2013.01)
(58) Field of Classification Search
CPC ......... A47J 37/0713; A47J 37/07; A47J 33/00
See application file for complete search history.

(56) References Cited

U.S. PATENT DOCUMENTS

| D187,095 S | 1/1960 | Joseph | |
|---|---|---|---|
| 4,149,516 A * | 4/1979 | Hall | A47J 37/0713 |
| | | | 126/25 R |
| 5,113,699 A * | 5/1992 | Soriano | A47J 37/0745 |
| | | | 126/25 R |
| D351,083 S | 10/1994 | O'Brien | |
| 5,553,601 A * | 9/1996 | Parker | A47J 37/0763 |
| | | | 126/38 |
| 5,617,778 A | 4/1997 | Schroeter | |
| 5,676,044 A | 10/1997 | Lara, Jr. | |
| D427,839 S | 7/2000 | Toyama | |
| D484,737 S | 1/2004 | Bodum | |
| D586,610 S | 2/2009 | Hu | |
| 7,798,139 B2 | 9/2010 | Gagas et al. | |
| 2008/0135038 A1 | 6/2008 | Michel et al. | |
| 2008/0289619 A1 | 11/2008 | Schjerven, Sr. et al. | |

FOREIGN PATENT DOCUMENTS

| AU | 2005100933 A4 | 12/2005 |
|---|---|---|
| EP | 1532902 B1 | 3/2010 |
| FR | 2827146 | 10/2003 |
| GB | 1522639 | 8/1978 |
| WO | WO2006/116849 | 11/2006 |

* cited by examiner

*Primary Examiner* — Alfred Basichas
(74) *Attorney, Agent, or Firm* — Knobbe, Martens, Olson & Bear LLP

(57) ABSTRACT

A barbeque assembly for use in the preparation of cooked food having a bottom housing that defines one or more burner chambers, each burner chamber forming a cavity in the bottom housing, wherein each burner chamber has a burner support and a fuel supply opening. Each burner chamber has a burner positioned within the burner chamber, wherein the burner chamber has a plurality of holes that are configured to allow fuel to flow from the burner chamber cavity to the bottom housing. A plurality of retention elements are configured to secure the one or more burners within the bottom housing.

20 Claims, 19 Drawing Sheets

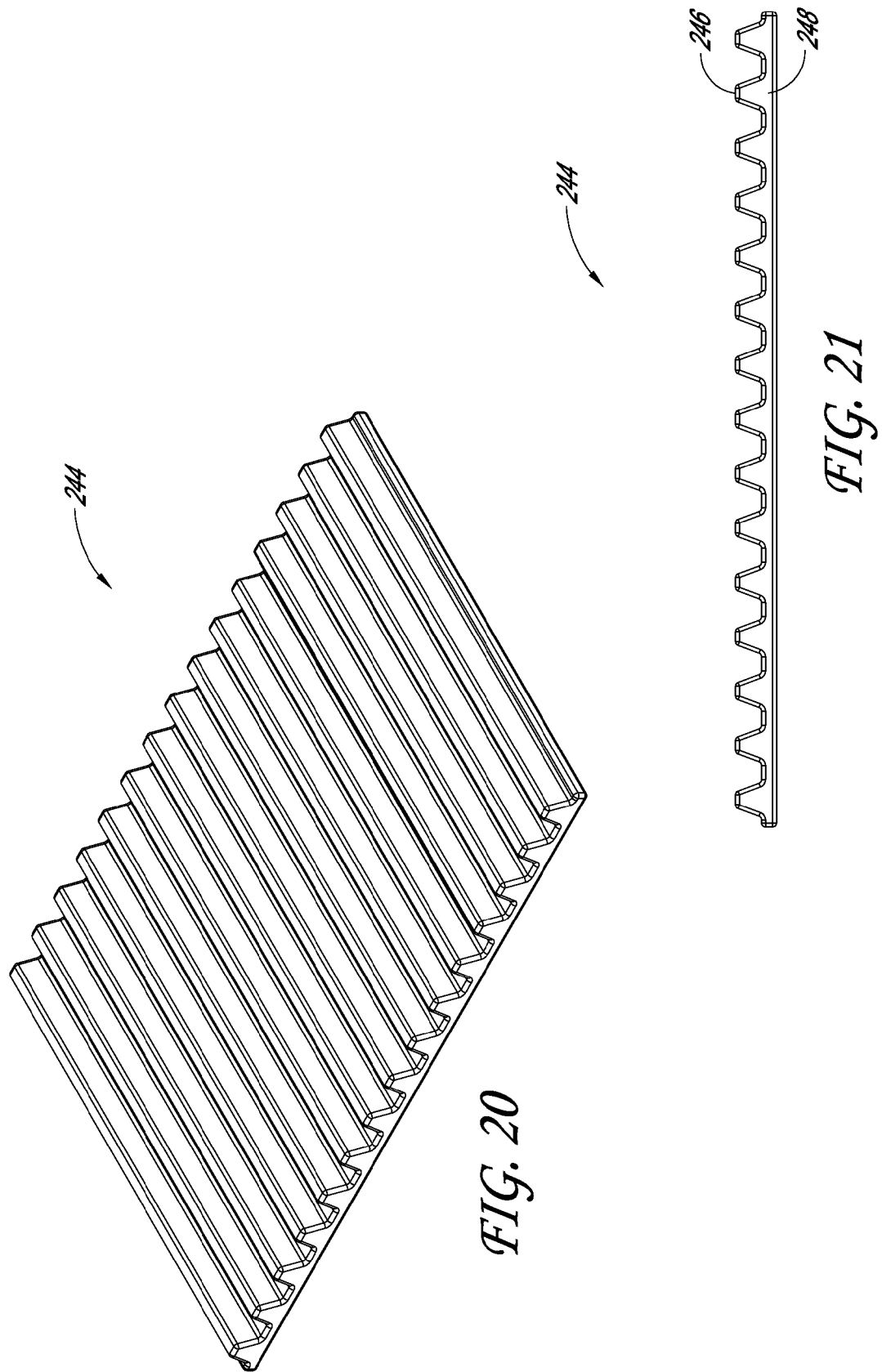

BARBEQUE GRILL

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

This disclosure relates generally to barbeques used for cooking food items, and more particularly barbeques using propane or natural gas as their fuel supply.

The grilling of meats like hamburgers, steaks, chicken and the like is favored by many people because of the flavoring and other properties imparted to the food product by the grilling process. This is particularly so in the case of cooking meats where the grease and drippings from the meat are burned or seared to impart onto the meat a smoked flavor. Also, grilling releases fats and hence reduces the caloric content of the food product.

The typical gas barbecue includes a housing and one or more gas burners. These burners typically have a number of apertures or orifices through which gas is released and ignited in order to produce a flame for cooking and heating purposes. The flame area is typically long and narrow, and closely matches the long, narrow shape of the burner. One problem encountered with such barbecues is the inefficiency associated with such burners, as the limited flame area provided by the burners requires excessive fuel for adequate cooking. In addition, such barbeques are difficult to assemble and even more difficult to disassemble once used and food grease has covered the grill's internal parts. Therefore, cleaning such grills is difficult and time consuming.

SUMMARY

Accordingly there is a need in the art for a barbeque system that provides more efficient grilling and a flame area that is wider and more closely matches the shape and area of the cooking surface. Furthermore, a barbeque unit that is easy to clean and service would be desirable, as well. For example, a barbeque system that can be disassembled and placed within a standard dishwashing machine would provide unmatched convenience and cleanability.

In one embodiment, a barbeque assembly for use in the preparation of cooked food is provided. The barbeque assembly includes: a bottom housing having an internal grill area and defining one or more burner chambers, each burner chamber formed as a cavity in the bottom housing, wherein each burner chamber has a chamber cover support and a fuel supply inlet; one or more regulators, each regulator having a gas inlet and a gas outlet stem and defining a fluid flow path between the gas inlet and the gas outlet stem, wherein the regulator is operable to open and close the fluid flow path, wherein the regulator is configured to couple with a fuel supply, wherein the gas outlet stem is configured to be positioned within the fuel supply inlet to supply fuel to the burner chamber; one or more chamber covers, each chamber covers having a first face and a second face and a plurality of passageways extend from the first face through to the second face, wherein the chamber covers is configured to be positioned within the burner chamber, wherein the chamber covers is configured to allow fuel to flow from the burner chamber cavity through the plurality of passageways to the first face; and a plurality of retention elements, wherein the plurality of retention elements are configured to secure the one or more chamber covers within the bottom housing.

In one embodiment, the barbeque assembly also includes one or more gaskets coupled to the one or more chamber cover supports, wherein the chamber cover is positioned adjacent the gasket, wherein the gasket is configured to compress when the retention elements hold the one or more chamber covers in place. In another embodiment, barbeque assembly also includes a support stand coupled to the bottom housing. The bottom housing may be rotatable about the support stand, wherein the support stand is configured to adjust the height of the bottom housing. The barbeque assembly may also include a lid rotatably coupled to the bottom housing, and in some embodiments, the lid includes a glass window.

In some embodiments, the barbeque assembly also includes a grill coupled to the bottom housing, wherein the grill has a plurality of slats and a plurality of crossbars that form a plurality of holes. In other embodiments, the barbeque assembly includes a grill formed of ceramic glass, wherein the grill comprises a solid base and a plurality of slats. In some embodiments, the bottom housing is formed from a single piece of material, such as injection molded aluminum. In some embodiments, bottom housing is formed from more than one piece of material.

In one embodiment, the gas chamber cover is made from ceramic. In one embodiment, each retention element comprises a clip having a first compression surface and a second compressions surface, wherein a spacing between the first compression surface and the second compression surface is larger than the thickness of the gas chamber cover.

In some embodiments, the bottom housing further comprises a plurality of air inlets. In another embodiment, the barbeque assembly also includes at least one accessory tray coupled to the bottom housing. In another embodiment, the bottom housing is configured to be washable in a dishwasher. In yet another embodiment, the plurality of passageways are substantially distributed over the entire surface of the gas chamber cover, and configured such that fuel supplied to the burner chamber is evenly distributed about the entire first face of the gas chamber cover.

In another embodiment, a method of operating a barbeque system for the preparation of cooked food is provided. The method includes: providing a bottom housing having an interior chamber and a burner chamber, wherein the burner chamber has a fuel supply opening and a burner chamber cover support, wherein a gasket is coupled to the burner chamber cover support; positioning a burner chamber cover having a plurality of passageways extending from a top surface of the burner chamber cover to a bottom surface of the burner chamber cover within the burner chamber and adjacent the gasket, wherein the top surface of the burner faces the interior chamber and the bottom surface of the burner faces the burner chamber; supplying fuel to the burner chamber, wherein the fuel flows into the burner chamber and through the plurality of passageways, wherein the fuel flows from the bottom surface of the burner chamber cover to the top surface of the burner chamber cover; and combusting fuel that flows out of the top surface of the burner chamber cover within the interior chamber and substantially at the top surface of the burner chamber cover.

In some embodiments, the method also includes securing the burner chamber cover to the burner chamber with at least one burner retention member, wherein said securing causes the gasket to compress.

In yet another embodiment, a barbeque assembly that does not include a separate, removable burner is provided. The barbeque assembly includes a bottom housing, an o-ring, a cavity cover, and at least one retention clip. The bottom housing includes at least one side wall and a bottom wall, the bottom wall is shaped to define a gas collection cavity and a cavity cover support positioned above the gas collection cavity, the bottom wall having a gas inlet and at least one retention clip opening. The o-ring is positioned around an opening to the gas collection cavity and supported by the cavity cover support. The cavity cover is positioned in contact with the o-ring and at least partially covers the gas collection cavity. The at least one retention clip has upper and lower extension portions, wherein the lower extension portion is sized to fit within the retention clip opening, and wherein the upper and lower extension portions are sized and spaced from each other sufficiently to retain the cavity cover against the o-ring, covering the gas collection cavity.

BRIEF DESCRIPTION OF THE DRAWINGS

FIG. 20 is an isometric view of an embodiment of a grill.
FIG. 21 is a side view of the embodiment of a grill from FIG. 20.

DETAILED DESCRIPTION

Figure 1:
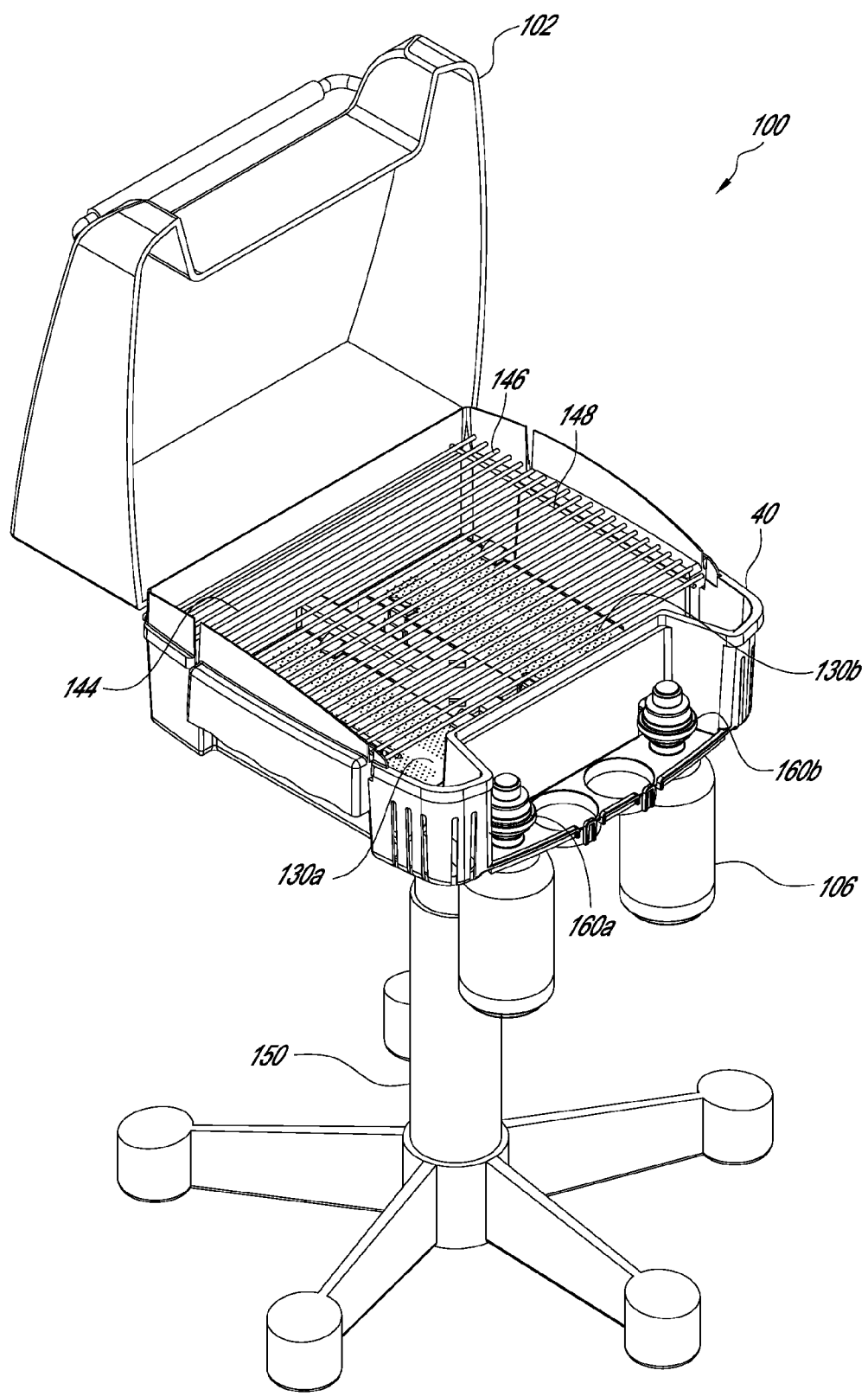
FIG. 1 is an embodiment of a barbeque grill assembly.
Figure 2:
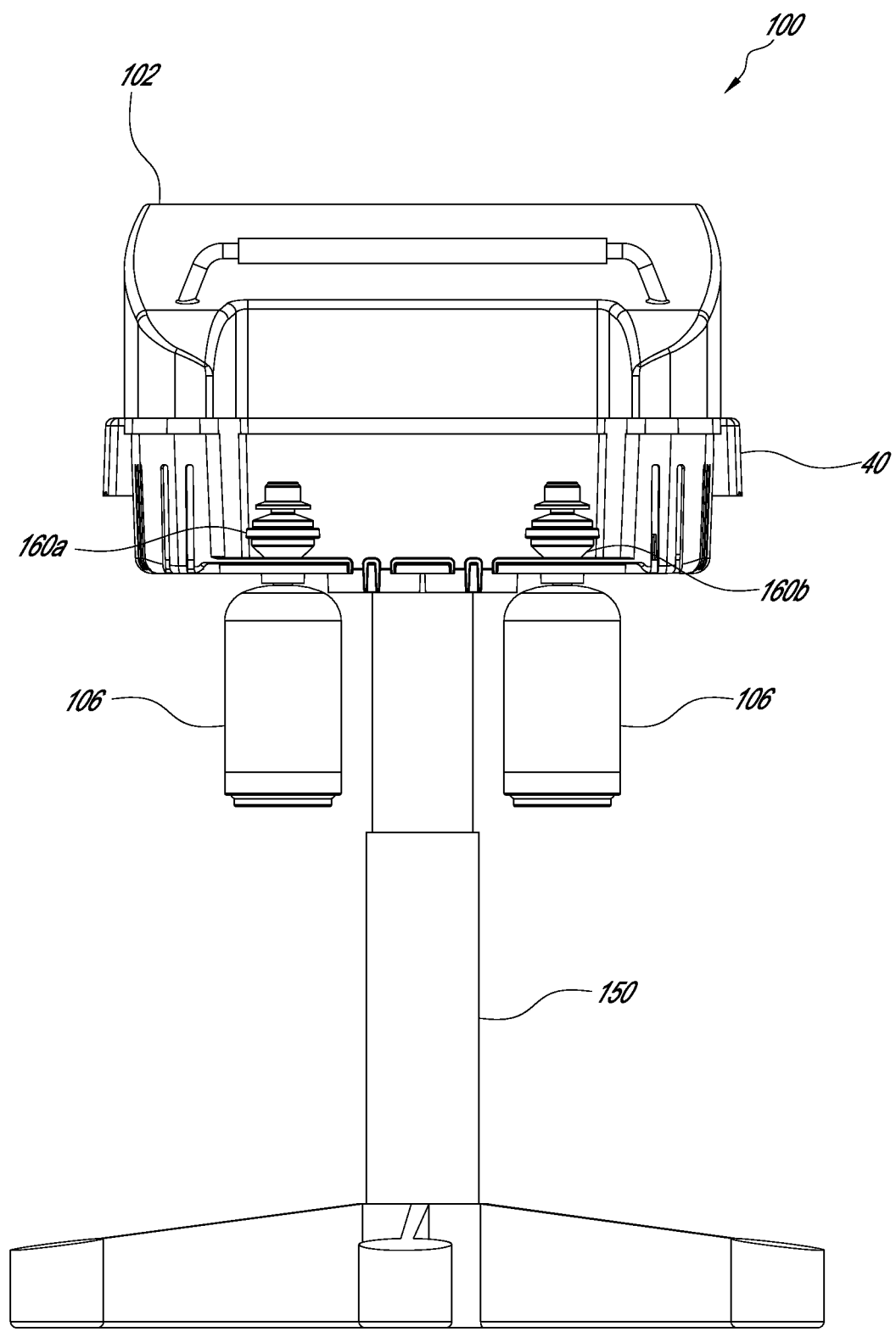
FIG. 2 is a front view of the barbeque grill assembly from FIG. 1.
Figure 3:
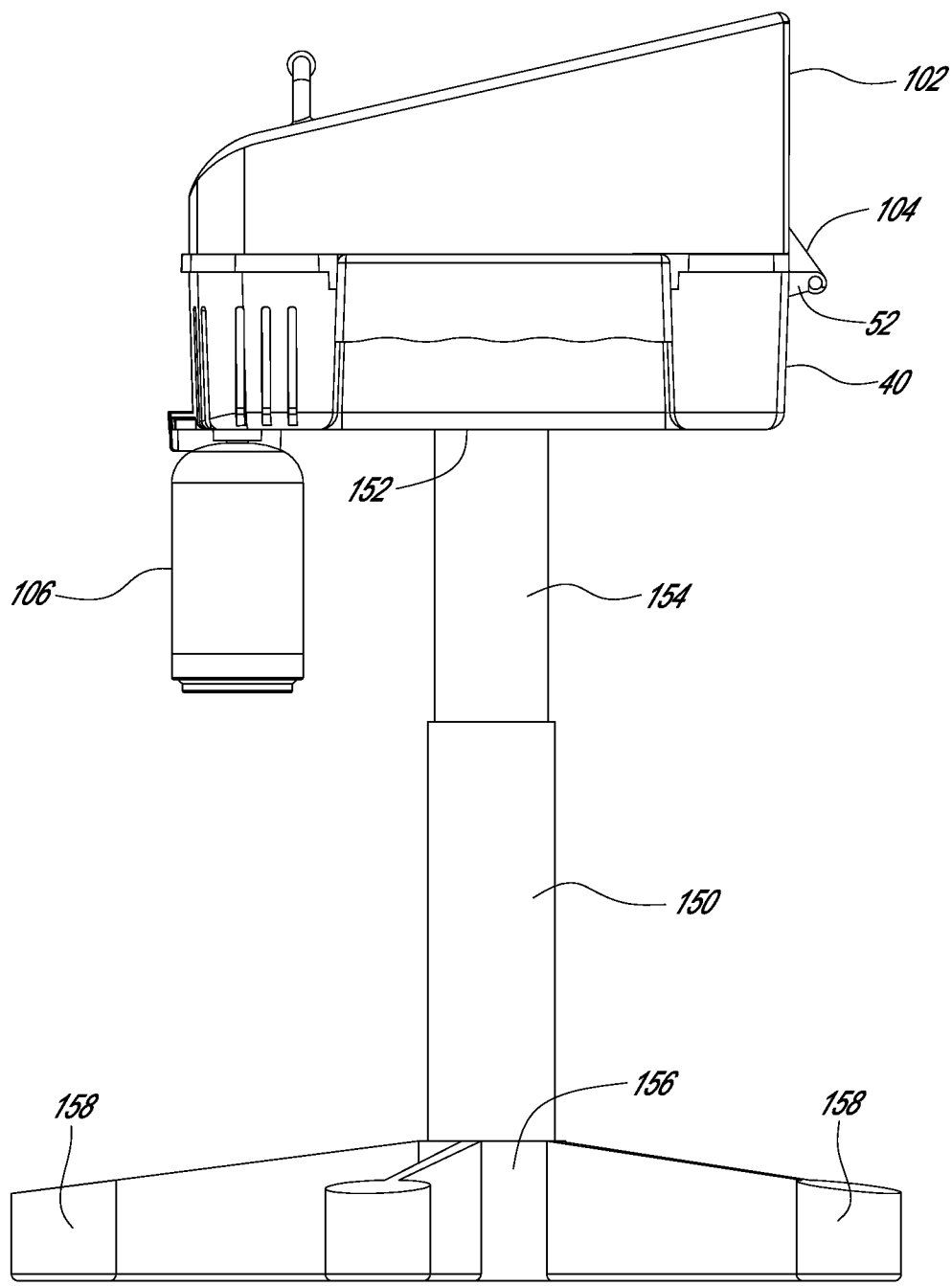
FIG. 3 is a side view of the barbeque grill assembly from FIG. 1.
Figure 4:
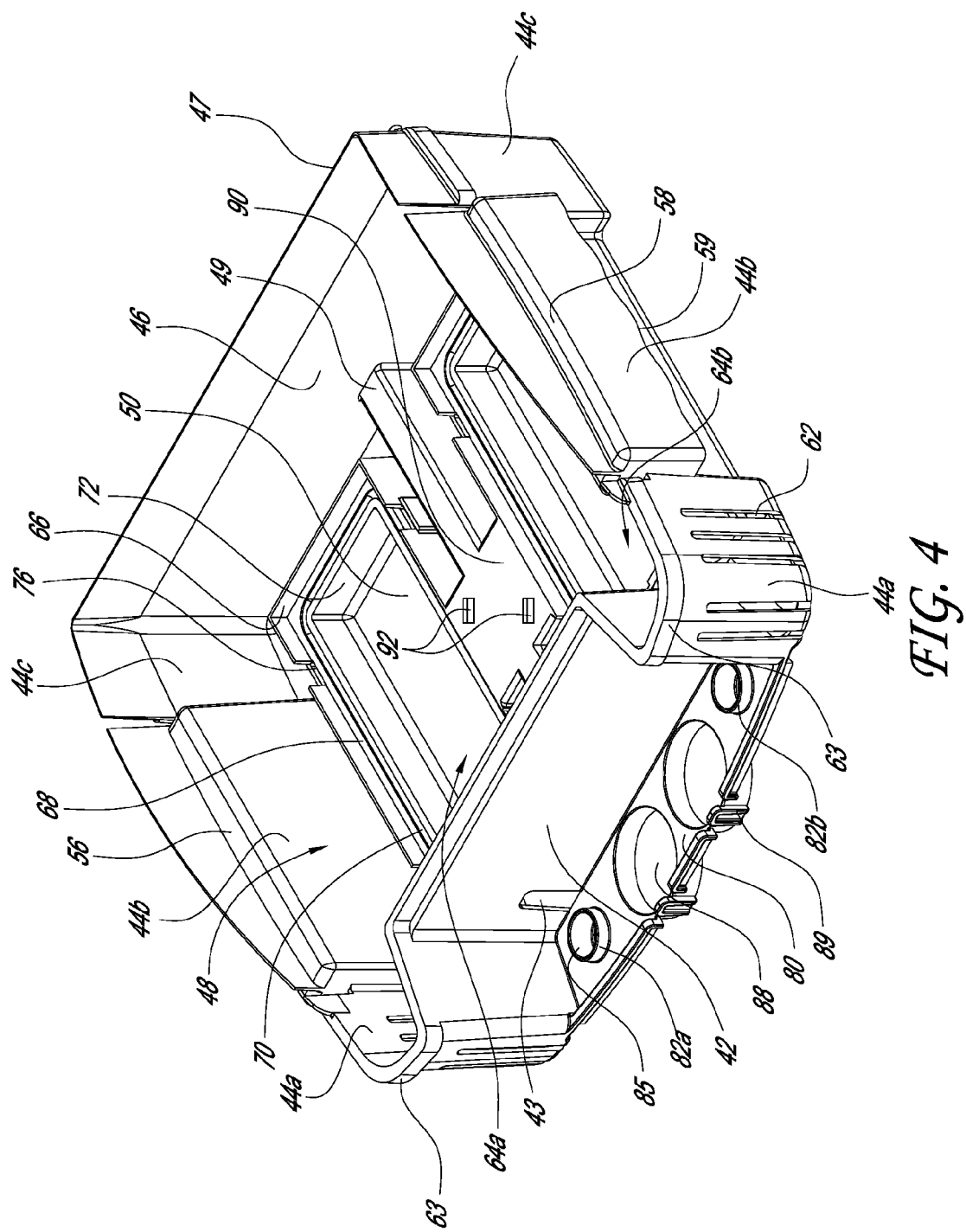
FIG. 4 is an embodiment of a bottom housing of a barbeque grill assembly.
Figure 5:
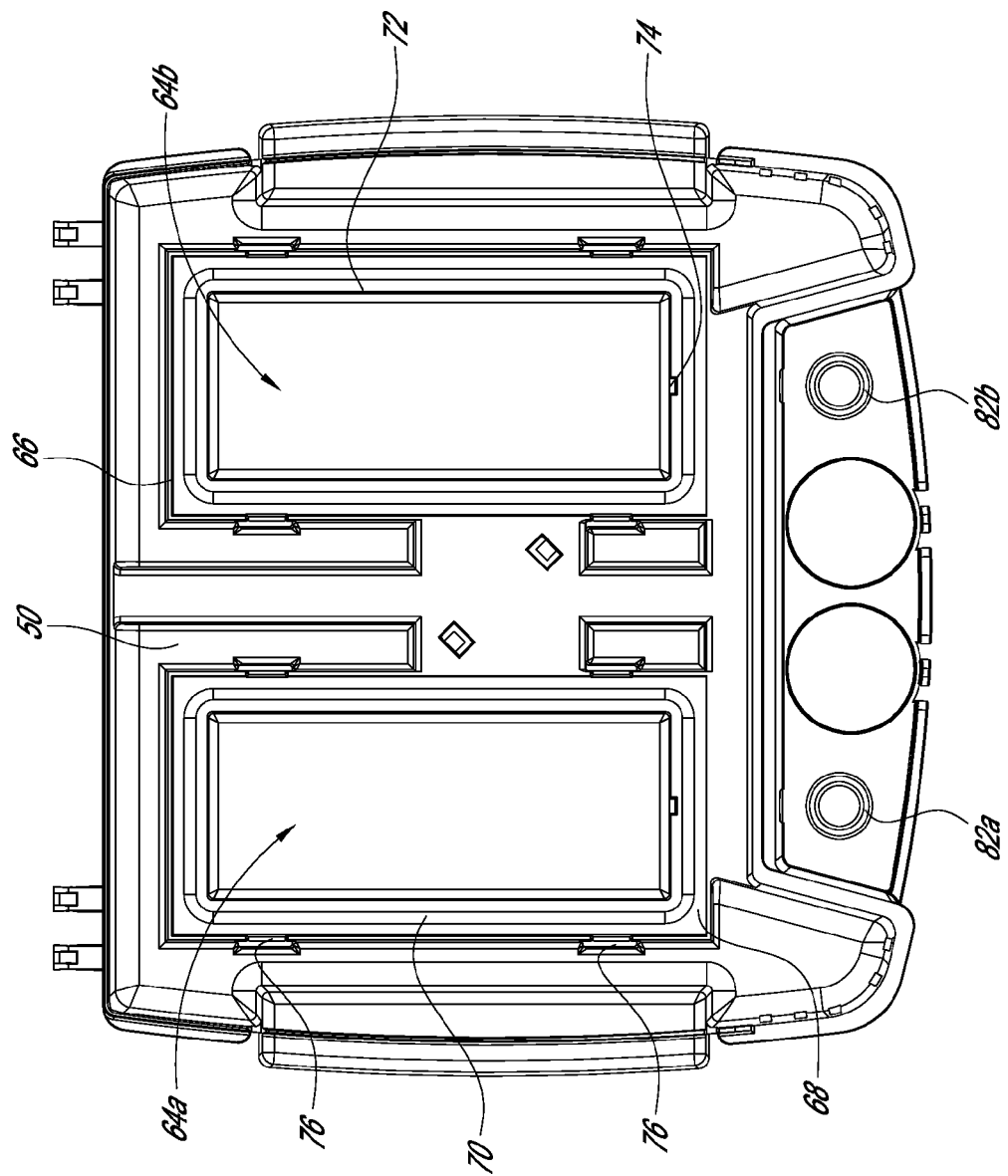
FIG. 5 is a top view of the bottom housing from FIG. 4.
Figure 6:
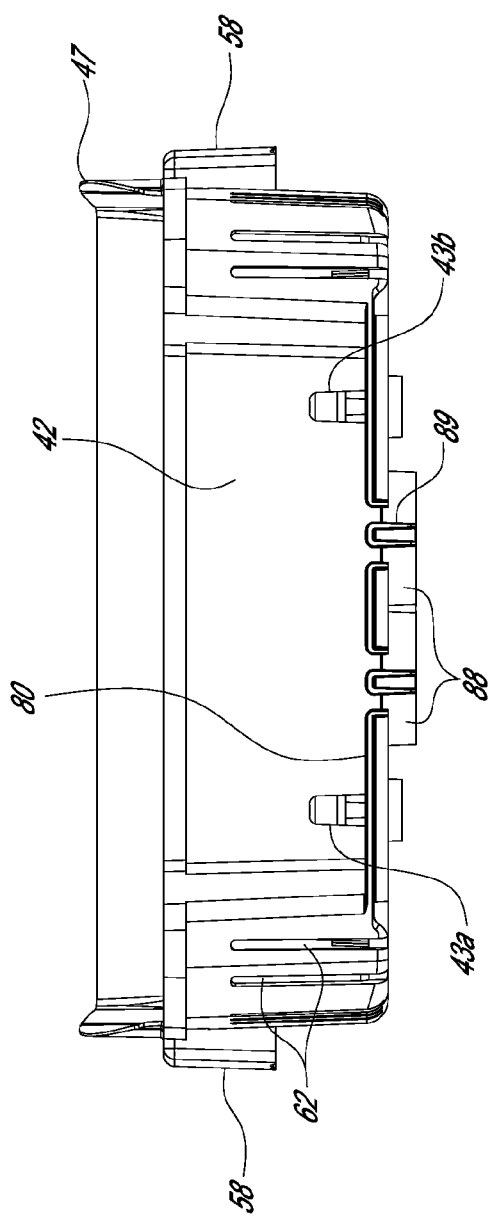
FIG. 6 is a front view of the bottom housing from FIG. 4.

FIGS. 1 through 3 illustrate an embodiment of a gas barbeque 100. The gas barbeque 100 includes a bottom housing 40, a lid 102, a grill 144, a stand 150, regulators 160, gas chamber covers 130, and fuel tanks 106. FIG. 1 illustrates the gas barbeque 100 with the lid 102 open. FIGS. 2 and 3 illustrate the gas barbeque 100 with the lid 102 closed. The lid 102 is coupled to the bottom housing 40 via a hinge (not shown). The hinge allows the lid 102 to be easily separated and removed from the bottom housing 40. The support stand 150 is coupled to the bottom housing 40. The support stand 150 allows the bottom housing 40 to be rotated, raised and lowered with respect to the support stand 150. The fuel tanks 106 are coupled to regulators 160a-b. Two burners are formed as cavities within the bottom housing 40 that are covered by the removable gas chamber cover plates 130. This embodiment of the gas barbeque 100 is configured to have two separate burners, although in other embodiments, one, or three or more burners are provided. In one embodiment, the burner is formed from a single cavity that is substantially the entire area of the bottom surface of the bottom housing 40. The burners are configured to heat the grill area by combusting fuel supplied by the fuel tanks 106. The supply of fuel to each burner is controlled by regulators 160a-b. The first regulator 160a adjustably controls the fuel supply to the first burner independent of the second regulator 160b, and second regulator 160b adjustably controls the fuel supply to the second burner independent of the first regulator 160a.

Bottom Housing

FIGS. 4 through 8 illustrate an embodiment of a bottom section or grill housing 40 of a gas barbeque 100. The bottom housing 40 has a front wall 42, sidewalls 44, and a back wall 46 that form an interior section or grill area 48. An exterior tray area 80 is formed in a front section of the housing. The interior section 48 defines a first burner chamber 64a and a second burner chamber 64b, and a support stand mount 90. The exterior tray portion 80 has a first regulator housing 82a and a second regulator housing 82b, beverage holders 88, and utensil hooks 89. Some embodiments exclude the holders 88, hooks 89, or both.

Figure 7:
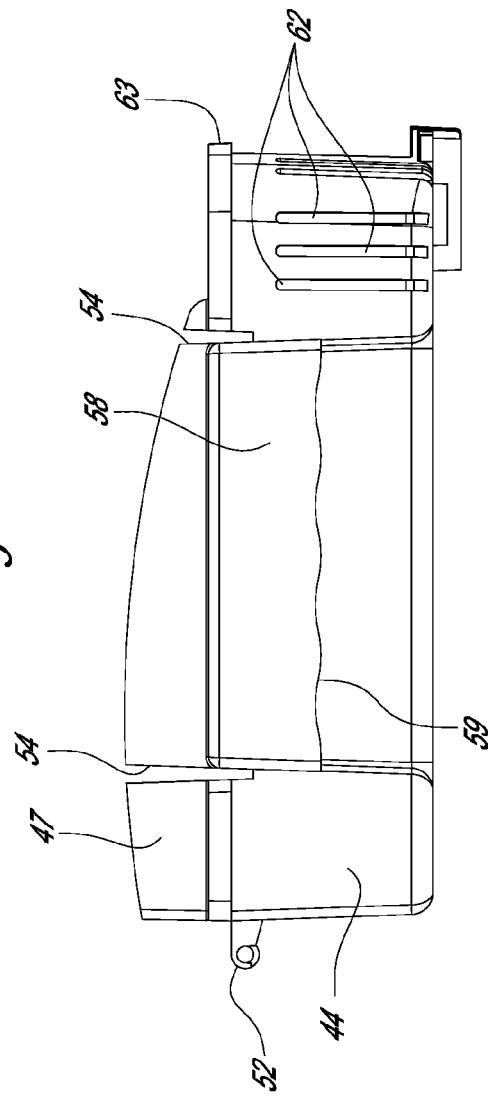
FIG. 7 is a side view of the bottom housing from FIG. 4.
Figure 8:
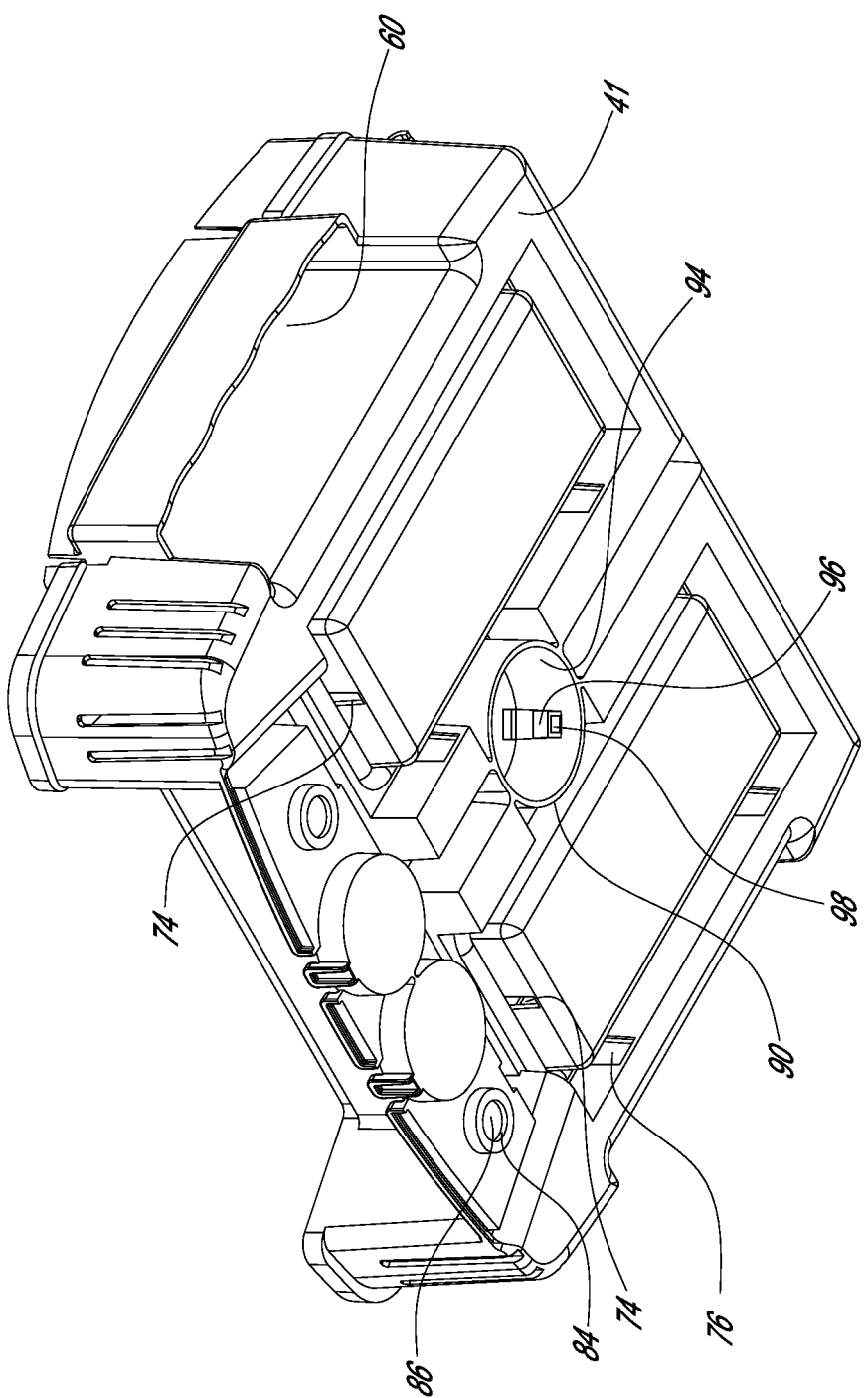
FIG. 8 is a perspective view of the underside of the bottom housing from FIG. 4.

The interior section 48 of the bottom housing is formed by the front wall 42, the sidewalls 44, the back wall 46, and a base 50. The back wall 46 is substantially flat and extends vertically from the base 50. The back wall 46 extends between the sidewalls 44. A lid wall 47 extends above the back wall 46 and sidewalls 44. In this embodiment the lid wall 47 is thinner than the back wall 46 and sidewalls 44 and is configured to fit within the lid 102 when closed. The upper profile of the lid wall 47 can have a slight curvature as illustrated in FIG. 7. In some embodiments, the lid wall 47 is omitted. A pair of mounts 52 are disposed on the back wall 46 that are configured to couple with the lid 102. In some embodiments, there may be more than two mounts. In some embodiments, the mounts 52 are used to form one or more hinges.

The sidewalls 44 extend from the back wall 46 and curve around to the front side of the bottom housing 40 and up to the exterior tray portion 80. The sidewalls are mirror images of each other. In this embodiment, the sidewall 44 is divided into a front section 44a, a middle section 44b, and a back section 44c by grooves 54 that extend downwards from the top of the lid wall 47 toward the base 50. In some embodiments, the grooves 54 are omitted. The middle section of the sidewall 44b has an inner shelf 56 and an outer shelf 58 that are positioned substantially between the grooves 54. The inner shelf or grill mount 56, extends partially into the interior portion 48 forming a shelf or ledge. In some embodiments the grill mount 56 has clips or other mounting hardware configured to secure a grill into position on the grill mount 56. The outer shelf 58, extends approximately halfway down the outside of the sidewall 44. The outer ledge 58 and inner ledge 56 form a cavity 60 in sidewall 44. The cavity 60 extends from the base 50 of the bottom housing to the top of the sidewall 44. The outer shelf 58 and cavity 60 form a bottom housing handle 59. The bottom housing handle 59 has a wavy profile, as shown in FIG. 7. In some embodiments the handle 59 may have a different profile, a rubberized coating, or other coating.

The front section of the sidewall 44a curves around to the exterior tray portion 80. A plurality of slots or grooves 62 extends through the front section of the sidewall 44a. The illustrated embodiment includes five slots 62 of substantially the same size and shape. The slots 62 extend from the base 50 to approximately ¾ of the height of the sidewall 44a. In some embodiments there may be more slots, less slots, or no slots. In other embodiments, the slots may have different configurations, including, different shapes, sizes, and the slots may not be a uniform size and shape. The slots 62 function as air inlets and allow air to pass between the interior section 48 and the surrounding environment. The sidewall 44 top includes a thicker lip section 63. The lip section 63 is thicker than the sidewall 44 below the lip section 63. The lip 63 is configured so that a bottom edge of a lid 102 may rest on top of the lip section when the lid 102 is closed.

The front wall 42 is divided into three sections that extend around the exterior tray area 80. The side sections of the front wall 42a mirror each other and extend from the end of the front section of the sidewall 44a toward the interior section 48 of the bottom housing 40. The middle section of the front wall 42b is substantially parallel to the back wall 46. The middle section of the front wall 42b has a step formed at the top of the wall. A first regulator opening 43a and a second regulator opening 43b are formed in the front wall 42b. The regulator openings 43 correspond to the positions of the regulator housings 82. The openings 43 are formed so that a regulator outlet stem 165 can be inserted through the opening 43 when a regulator 160 is placed in the regulator housing 82.

The bottom housing 40 has a first burner chamber 64a and a second burner chamber 64b. The burner chambers 64 are substantially the same size and shape. The burner chambers 64a-b are divided by a center divider 49. Each burner chamber 64 is substantially rectangular in shape and forms a cavity in the bottom housing 40. The chamber has an outer wall 66, an inner wall 72, a burner support 68, a fuel supply opening 74, and a plurality of retention clip openings 76. The outer chamber wall 66 extends vertically from the base 50. The shelf is substantially perpendicular to the outer chamber wall 66 and positioned below the top edge of the outer chamber wall 66. In this embodiment, the burner support forms a shelf 68 that is substantially the same width and extends substantially around the burner chamber 64. In some embodiments the burner support may not extend substantially around the burner chamber 64. In some embodiments, the burner support 68 may consist of a plurality of support struts that are substantially the same height. In other embodiments, there may not be a support shelf.

The illustrated embodiment includes a groove 70 formed on the shelf 68. The groove 70 is formed to accommodate a gasket or seal. The groove 70 is substantially the same size and shape along the entire length of the groove 70. In some embodiments there is no groove 70 on the burner support 68. An inner chamber wall 72 extends down to substantially the same level as the base 50 of the bottom housing 40.

The inner chamber wall 72 has a fuel supply opening or cutout 74. The fuel supply opening 74 is sized and shaped such that a regulator gas stem 165 can be accommodated within the opening 74. In this embodiment, there are four retention clip openings 76. The retention clip openings 76 are positioned on opposite sides of each other with two on each of the long sides of the outer chamber wall 66. The width of the opening 76 is sized and shaped to fit a retention clip 110. The opening 76 extends through the outer chamber wall 66 to the underside of the bottom housing 41. In some embodiments there may be no retention clip openings. The burner chamber 64 may have a plurality of holes configured to support mounting hardware such as screws or pegs to secure a burner.

The bottom housing 40 has a support stand mount 90. The support stand mount 90 is a cylindrical mount with two square shaped mounting holes 92 that extend through the bottom housing 40. A cylindrical-shaped recess 94 extends into the underside of the bottom housing 41. The top surface of the support stand mount 90 is substantially level with the top surface of the center divider 49 and the top surface of the burner chamber 64. Within the recess 94, there are two stand mounting tabs 96 that extend out from the wall of the recess 94. Each tab has a hole 98. The tabs 96 and holes 98 are located on opposite sides of the recess 94 and correspond to the mounting holes 92. The tabs and mounting holes are sized and shaped to be compatible with mounting equipment for a support stand 150.

The exterior tray portion 80, or tray, is substantially perpendicular to the front wall 42. A plurality of cup or beverage holders 88 is formed in the tray 80. The beverage holders 88 are cylindrical and extend into the tray 80. The diameter of the cup holders 88 are sized such that a typical cup, can, or bottle could fit within the circumference of the cup holder 88. A utensil hook 89 is formed in front of each cup holder 88.

A first regulator housing 82a and a second regulator housing 82b are formed on the tray 80. The regulator housings 82a-b are substantially the same and correspond to the first burner chamber 64a and the second burner chamber 64b. The regulator housing 82 is a cylinder having a diameter and a wall thickness that may extend above and below the tray 80. The housing 82 has a first or top opening 85 and a second or bottom opening 86. At the bottom opening of the cylinder 86 there is a regulator support lip 84. The diameter of the bottom opening 86 can be less than the diameter of the top opening 85. The regulator housing 82 is configured so that the regulator 160 is inserted through the top opening 85 and the regulator 160 is supported by the support lip 84. The bottom opening 86 is sized and configured such that the fuel tank 106 can couple to the regulator 160 through the bottom opening 86.

The bottom housing can be formed 40 from a single piece of material. The housing can be manufactured using injection molded aluminum. Aluminum injection molding can produce parts with thinner walls and more intricate shapes. The bottom housing can be produced as a single unit, which may be lightweight and more economical than assembling the housing from multiple pieces. In this embodiment the bottom housing is formed from a single piece of material. In some embodiments the bottom housing may be formed and assembled from multiple pieces of material. The bottom housing may be configured to have a single burner chamber or may be configured to have three or more burner chambers.

Gas Chamber Covers

Figure 9:
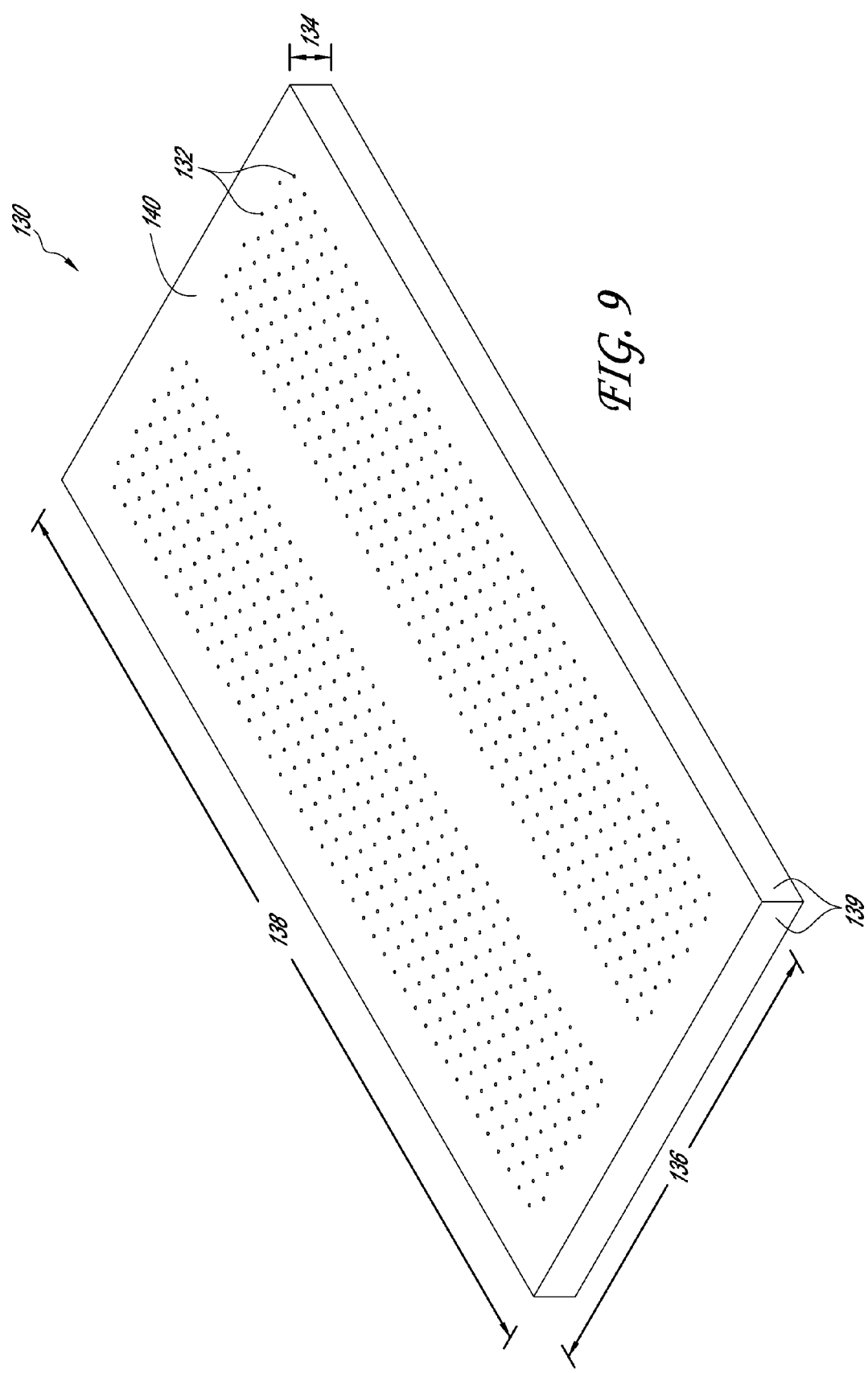
FIG. 9 is an embodiment of a gas chamber cover.
Figure 10:
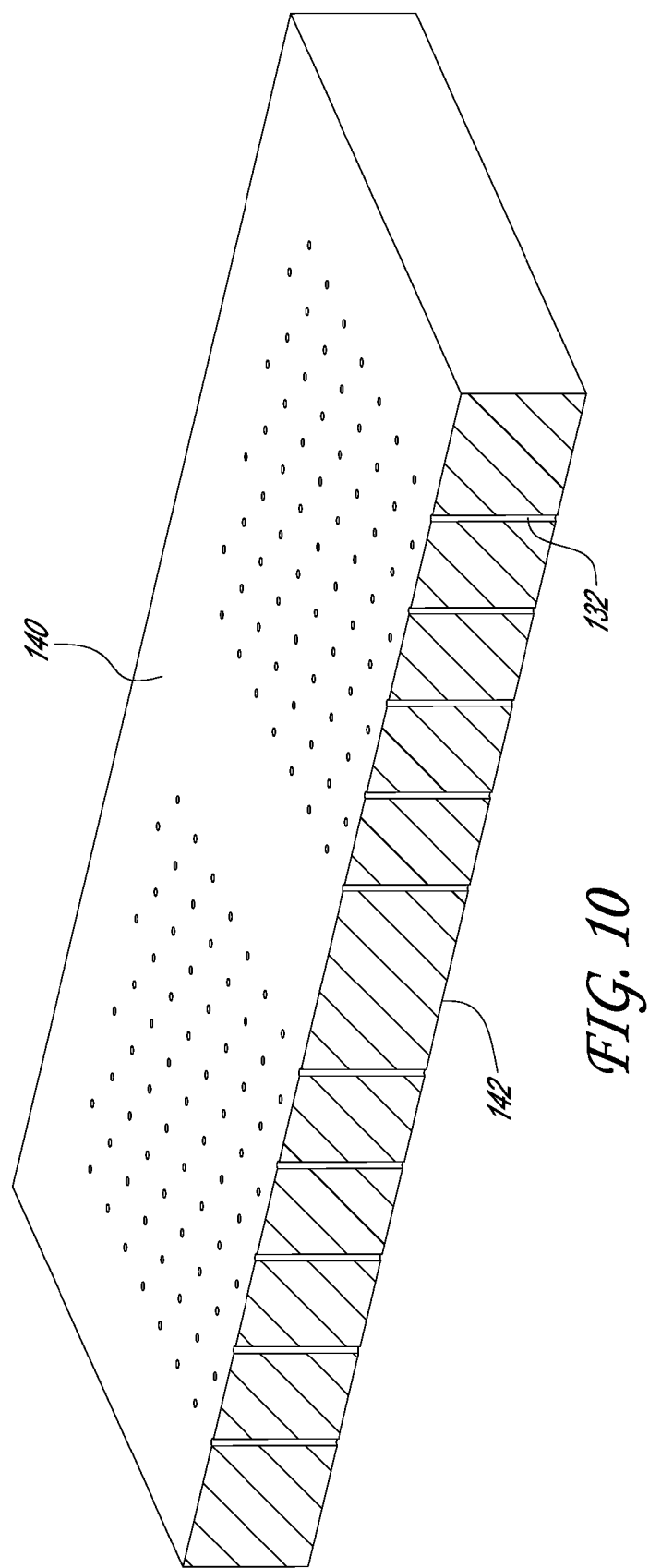
FIG. 10 is a cross section of the gas chamber cover from FIG. 10.

FIGS. 9 and 10 illustrate an embodiment of a burner's gas chamber cover 130. The gas chamber cover 130 is rectangular in shape and has a length 138, a width 136, and a thickness 134. The gas chamber cover 130 can be formed as a single ceramic unit. In some embodiments other materials may be used for the burner, or multiple ceramic pieces may be coupled together. The gas chamber cover 130 can be formed from metal such as stainless steel, etc. The gas chamber cover 130 has a first side or top surface 140 and a second side or bottom surface 142. The top surface 140 and the bottom surface 142 are substantially parallel. The gas chamber cover 130 has a solid body. The burner has a plurality of holes or channels 132 that extend through the gas chamber cover 130 from the top surface 140 to the bottom surface 142. The plurality of holes or channels 132 are substantially the same size and shape. The holes 132 are arranged in a predetermined pattern on the gas chamber cover 130. In this embodiment the holes 132 are arranged in a repeating pattern, where every other row has the same hole pattern lengthwise along the gas chamber cover 130. In other embodiments the hole pattern may be different.

The number of holes can be used to control the temperature of the barbeque. The arrangement of the holes 132 helps determine the distribution of the heat over the surface of the gas chamber cover 130 and the barbeque. The even distribution helps to provide a uniform distribution of heat in the grill area when operated. In other embodiments, the arrangement of the holes and/or the size of the holes can vary to achieve different heat intensities and temperatures. The heat intensity of a gas burner cover can be in part controlled by increasing or decreasing the number of holes on the surface of the cover 130. For example, in some embodiments, a gas chamber cover 130 is configured to provide high intensity, medium intensity, or low intensity heating. The medium intensity cover can have more holes, or a greater hole density, than the low intensity cover, and the high intensity cover can have more than the medium intensity cover. In some embodiments, the medium intensity cover can have about 3%, 5%, 7% or 10% fewer holes, or lower hole density (e.g., holes per grill surface area) than the high intensity burner, and the low intensity cover can have about 7%, 10%, 12%, or 15% fewer holes, or lower hole density, than the high intensity burner. The different intensity covers can be configured to provide intensities and ranges of temperatures that are appropriate for cooking specific types of food. For example, a low intensity cover could be used to cook fish, a medium intensity cover could be used to cook poultry, and a high intensity cover could be used to cook steaks.

Regulator

Figure 11:
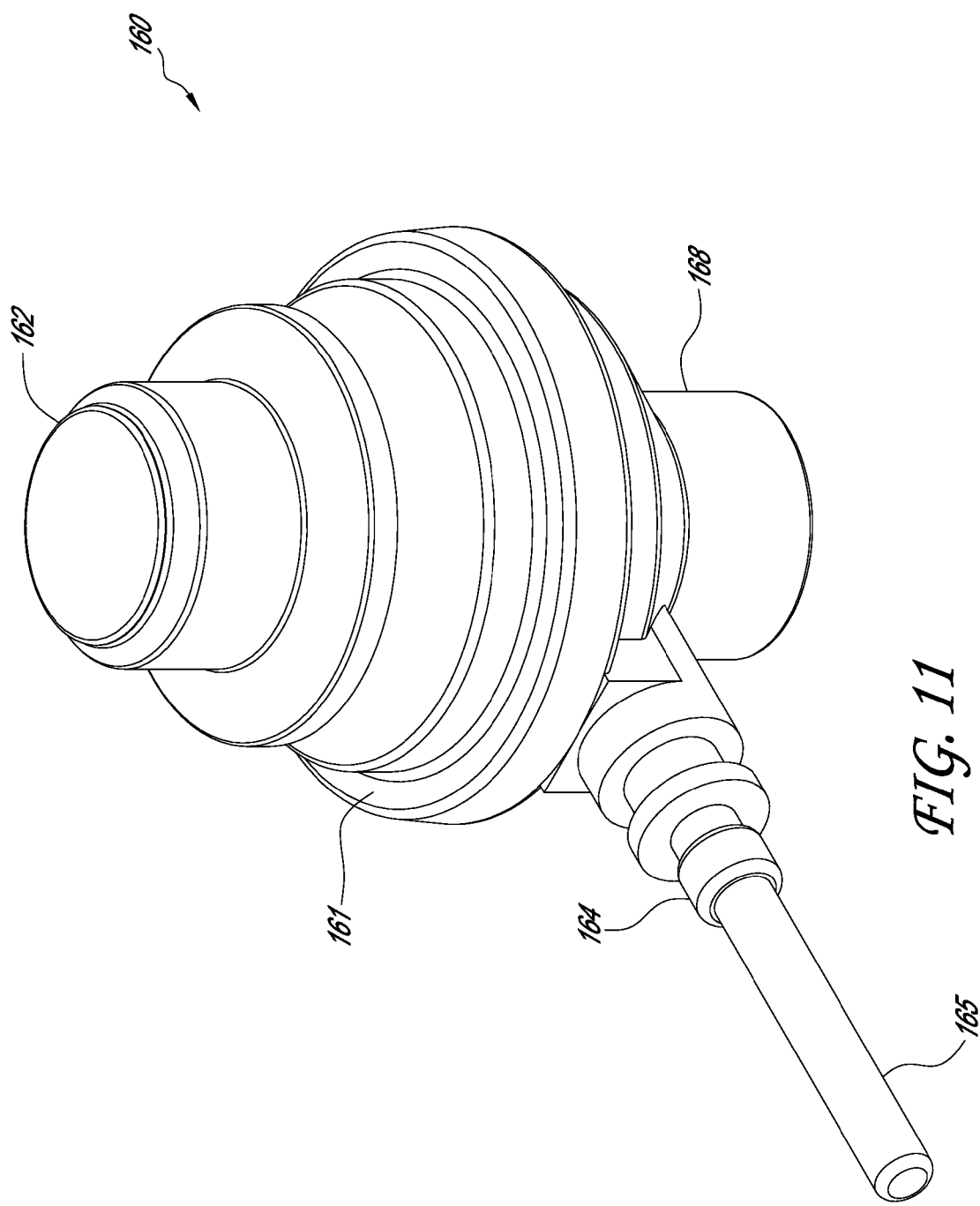
FIG. 11 is an embodiment of a regulator.
Figure 12:
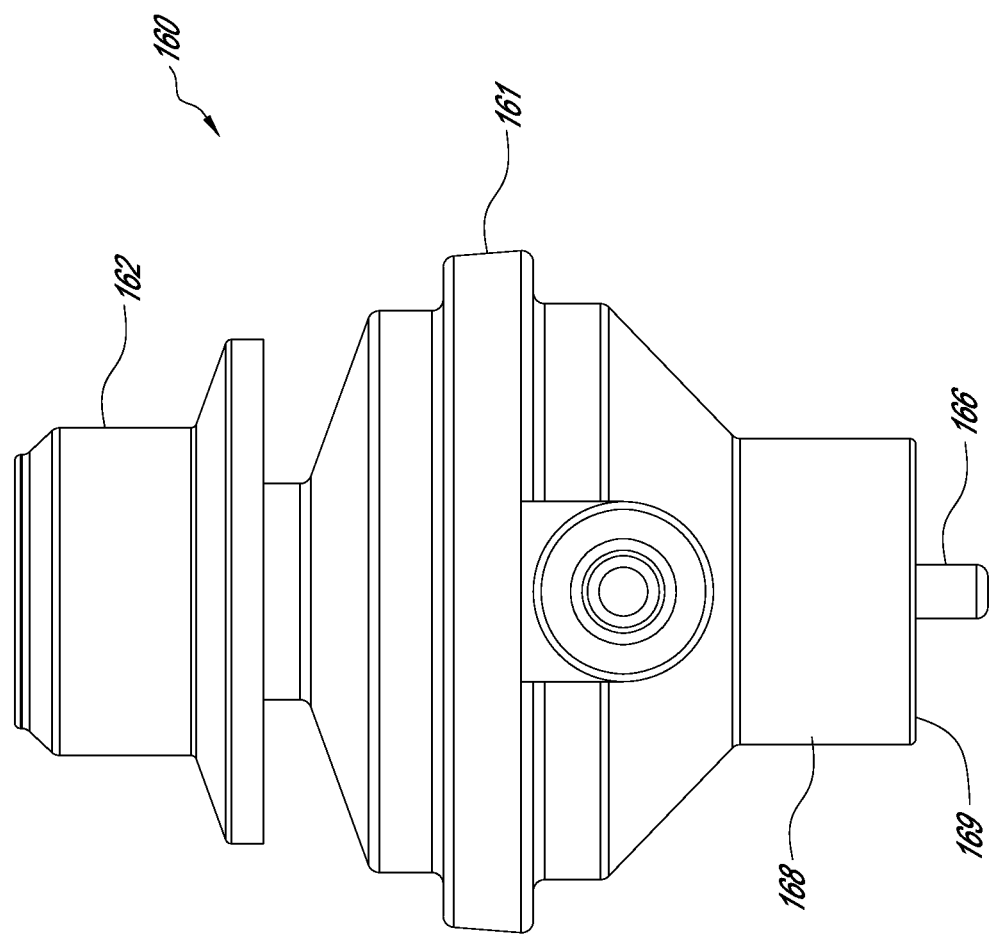
FIG. 12 is a front view of the regulator from FIG. 12.

FIGS. 11 and 12 illustrate an embodiment of a regulator 160. The regulator includes a manifold body 161, a gas inlet 166, a gas outlet 164, a regulator control knob 162, and a fuel tank interface 168. The manifold body 161 has a fluid flow passage that connects the gas inlet 166 and the gas outlet 164. The fluid flow rate of fuel through the fluid flow passage is controlled by the regulator control knob 162. The regulator control knob 162 is operable to open and close the fluid flow passage. The fluid flow rate can be adjusted between zero, when the fluid flow passage is closed, up to a maximum flow rate. Adjusting the fuel flow rate through the regulator directly controls the amount of fuel consumed and heat generated in the barbeque unit. Therefore, the regulators provide a mechanism for user control over the grilling temperature. The fuel tank interface 168 includes a cylindrical recess with a bottom surface or base 169. The fuel tank interface 168 has a threaded region on the inner wall that is configured to couple with a fuel source, such as propane or natural gas tank. Preferably the fuel tank is securely coupled to the regulator 160 such that fuel does not leak out of the fuel tank interface 168. The gas inlet 166 extends vertically downward from the manifold body 161. The stem of the gas inlet 166 and may extend beyond the base 169 of the fuel tank interface 168. The gas inlet 166 is configured to couple with a fuel supply and form a fluid flow passage between the inlet 166 and the fuel supply. The gas outlet 164 extends horizontally from the manifold body 161. The gas outlet 164 has a stem 165 that is configured to extend into a burner chamber 64 when assembled as part of the barbeque assembly 100. Preferably, the length of the outlet stem 165 can vary to accommodate different barbeque assemblies. Additionally the length of the stem 165 can vary to be positioned at different positions within the burner chamber 165. The pressure of the gas within the burner chamber can be controlled, in part, by the diameter of the gas outlet stem 165. In some embodiments the length and diameter of the outlet stem 165 can differ to modify the operating pressure within the barbeque.

Gasket

Figure 13:
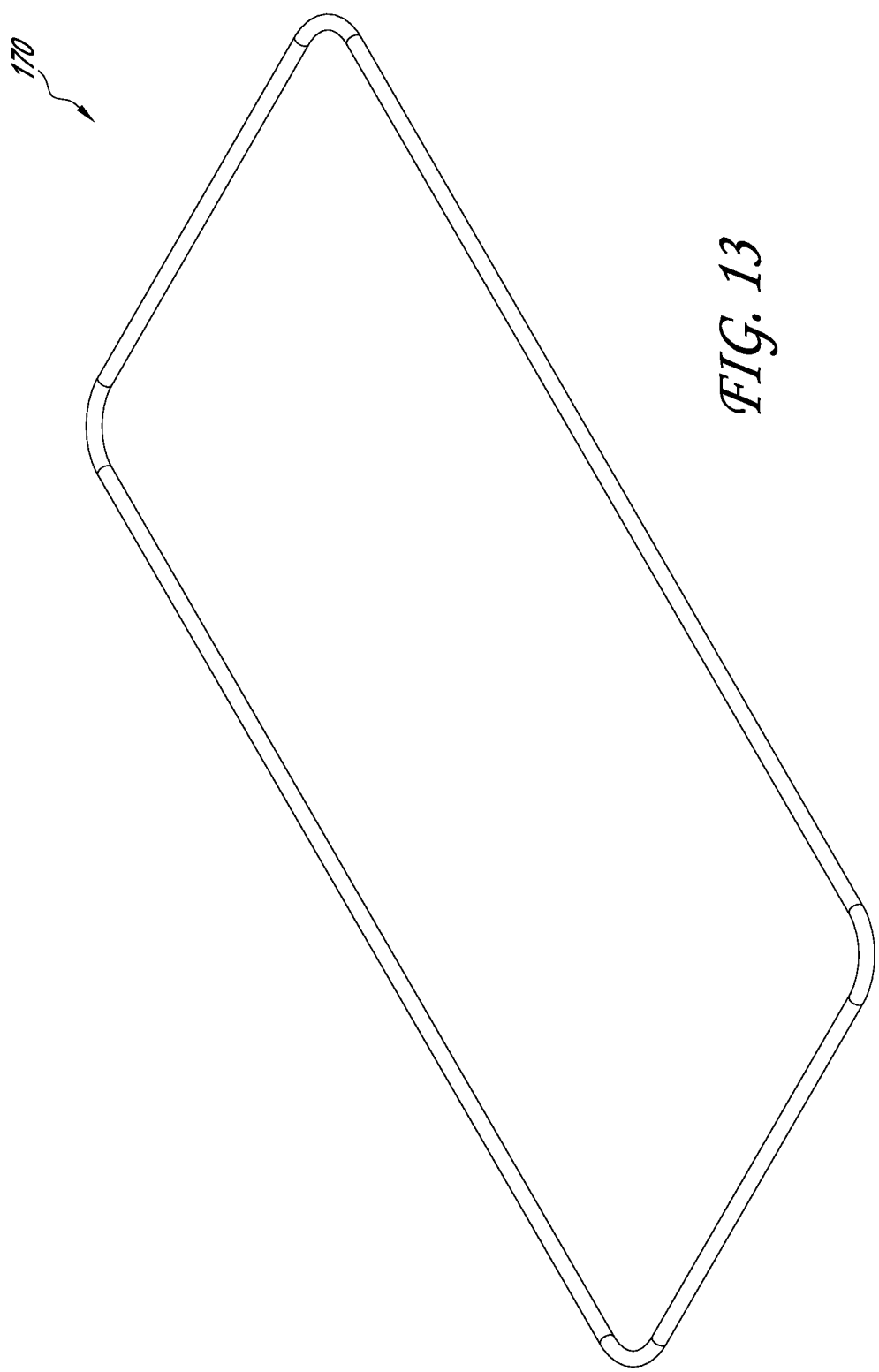
FIG. 13 is an embodiment of a gasket.

FIG. 13 illustrates an embodiment of a gasket or seal 170 (sometimes referred-to as an o-ring 170). In this embodiment the gasket 170 is substantially rectangular in shape and has a substantially circular cross sectional shape. In some embodiments the gasket 170 can have a different cross sectional shape, such as a square, rectangular, oval, or other shape. The gasket 170 can be formed from a fire-retardant material, such as Nomex®. The gasket 170 is sized and configured to fit substantially within the groove 70 on the burner support 68 and to provide a seal between the burner's gas chamber and cover 130. The diameter or height of the gasket 170 may be greater than the depth of the groove 70 so that a portion of the gasket 170 extends above the burner chamber shelf 68 when the gasket 170 is positioned within the burner chamber groove 70. The gasket 170 can be coupled to the burner chamber groove 70 using a heat resistant adhesive. The gasket 170 may be formed from an elastomeric material. Preferably the material is compressible, so that the gasket 170 can help form a seal with the burner 130. The gasket 170 and the spacing between the outer chamber wall 66 and the outer edge of the gas chamber cover 130, allow the gas chamber cover 130 to move with respect to the bottom housing 40 while maintaining a seal. In addition, the gasket 170 and the spacing between the outer chamber wall 66 and the outer edge of the gas chamber cover 130 allow for thermal expansion movement in the gas chamber cover 130.

Retention Clips

Figure 14:
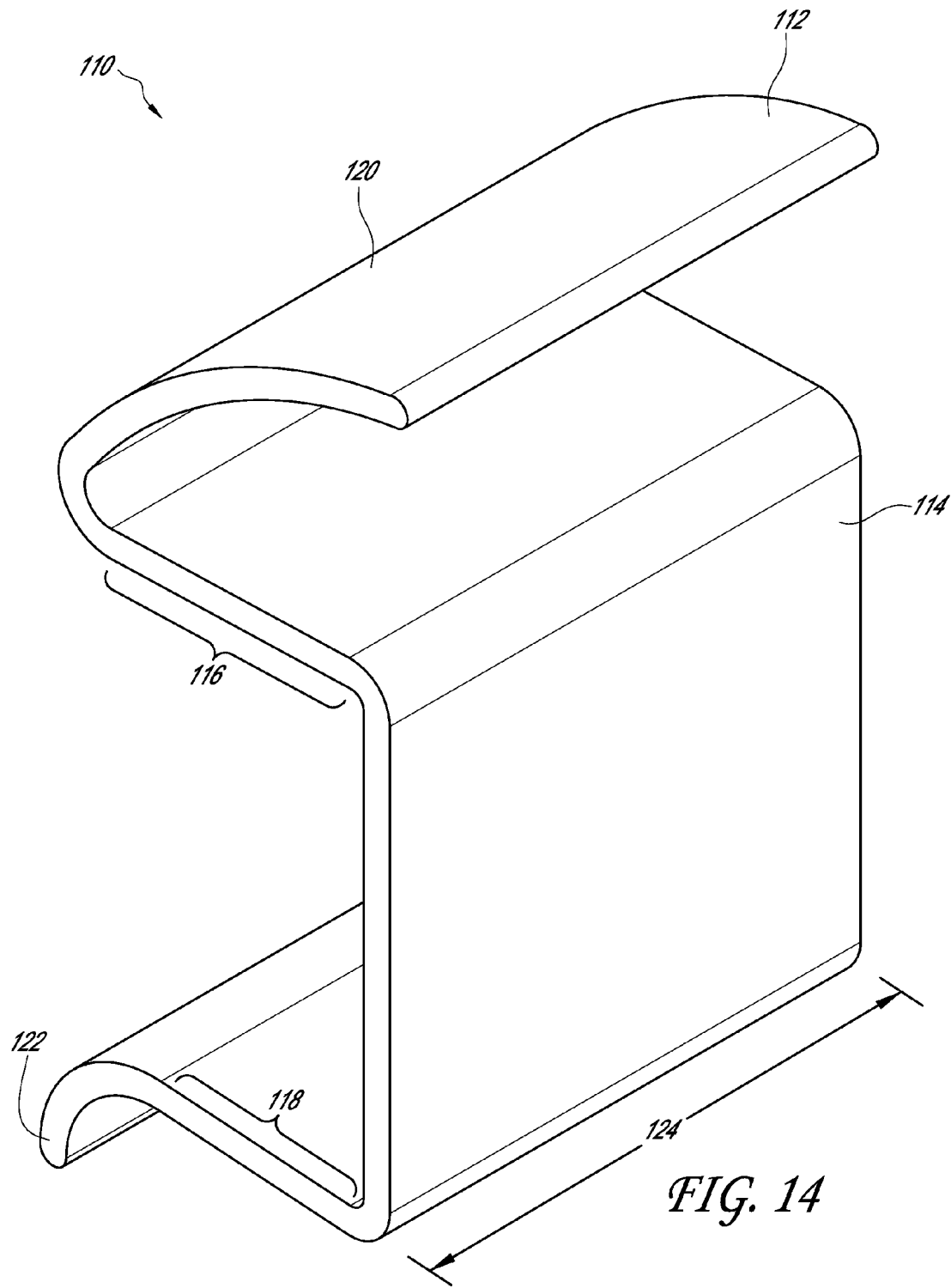
FIG. 14 is an embodiment of a retention clip.

FIG. 14 illustrates an embodiment of a retention clip 110. The retention clip 110 has a first or inner surface 112 and a second or outer surface 114. In this embodiment the clip has a uniform width 124. The width 124 of the clip is sized to fit within the retention clip opening 76 in the burner chamber 64. The clip is divided into a handle portion 120, a top or upper compression surface 116, a bottom or lower compression surface 118, and a foot portion 122. The retention clip 110 is configured to move between a compressed state and an expanded state. The expanded state is shown in FIG. 14. In the compressed state, the upper compression surface 116 is curved downward and the lower compression surface 118 is curved upwards.

When the retention clip is in the expanded state, the upper compression surface 116 exerts a downward force upon the surface adjacent to the upper compression surface 116 and the lower compression surface 118 applies an upward force to the surface adjacent to the lower compression surface 118 to squeeze the gas chamber cover 130 against the gasket 170 (sometimes referred to as a seal or o-ring 170). The upper compression surface 116 and the lower compression surface 118 apply opposite forces to the area between the surfaces when the retention clip 110 is in the expanded state. Preferably, the retention clip 110 is formed from a single piece of material, such as aluminum.

The retention clip 110 can be manipulated into the expanded position by pulling upward on the handle portion 120 and securing the foot portion 122 and bottom compression surface 118 against the underside of the bottom housing 41. Manipulating the retention clip 110 into the expanded position increases the area between the upper compression surface 116 and the lower compression surface 118 and allows the retention clip 110 to be positioned about the gas chamber cover 130. The opening or spacing between the upper and lower clip surfaces 116, 118 is large enough to accommodate the gas chamber cover 130 and the bottom housing 40 wall thicknesses, as shown in FIG. 17.

Figure 17:
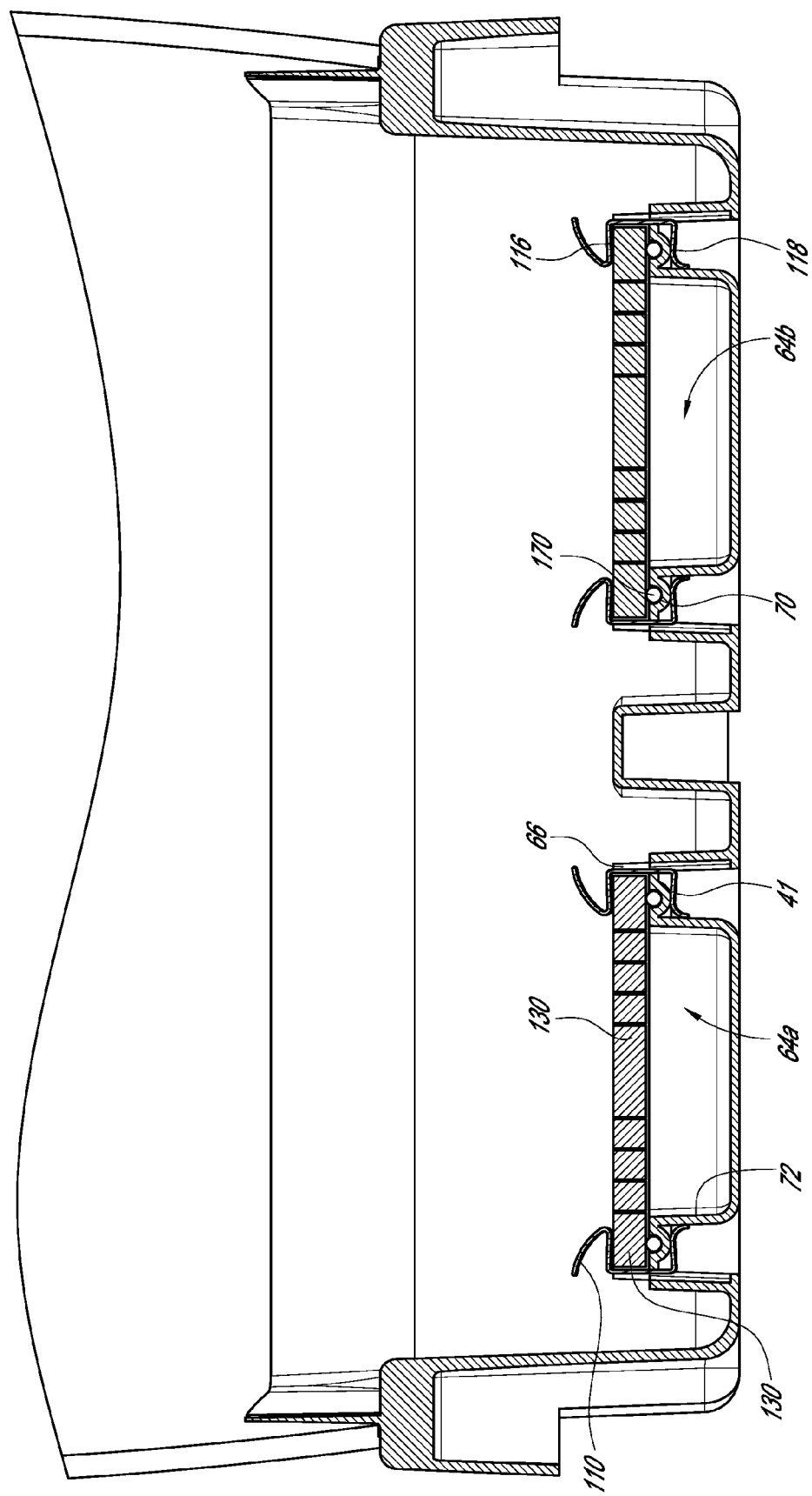
FIG. 17 is section view of the bottom housing showing the retention clip assembly from FIG. 15.

FIG. 17 illustrates a cross section of a burner assembly, which illustrates the use of the retention clip 110 to secure the gas chamber cover 130 to the burner chamber 64 without the use of any screws. The retention clip 110 is configured so that when a gas chamber cover 130 is positioned above a burner chamber 64, the upper compression surface 116 exerts a downward force on the top surface 140 of the gas chamber cover 130 and the lower compression surface 118 exerts an upward force on the underside of the bottom housing 41, thereby, securing the gas chamber cover 130 to the burner chamber 64. Preferably, the retention clips are configured to allow the shifting and slight movement caused by different rates of thermal expansion and contraction of the gas chamber cover 130, housing 40, and retention clips 110 during operation of the barbeque assembly 100.

Support Stand

An embodiment of a support stand 150 is illustrated in FIGS. 1 through 3. In the illustrated embodiment, the support stand is a floor mount stand and is about 30", 36", or 42" tall. The stand includes a bottom housing engagement interface 152, a vertical support 154, a base 156, and a plurality of legs 158. The vertical support 154 can include a telescoping support to allow adjustability of the grill height. The vertical support 154 extends between the bottom housing engagement interface 152 and the base 156. The vertical support 154 can be a cylindrical column. The support can be another geometric shape or design that his configured to support the barbeque assembly 100. In some embodiments the support 154 may include telescoping functionality that allows the support 154 to move up and down along the vertical axis. A telescoping support 152 may be spring based, pneumatic based (e.g., a pneumatic gas cylinder), a manual height adjustment mechanism that is secured into position using a fastener (e.g., a bolt, pin, or thumb-screw, etc.), or other system that allows the adjustment of the vertical height of the bottom housing 40. The plurality of legs 158 extend out from the base 156 support to provide support for the for the barbeque assembly 100. In this embodiment there are five legs 158 that extend out from the base 156. The legs 158 are identical and are spaced circumferentially about the base 156. The bottom and/or ends of the legs may have textured surfaces or anti-slip coatings or pads to prevent movement of the barbeque assembly 100. In some embodiments, wheels are coupled to the legs to allow the barbeque assembly 100 to roll. The wheels may be plastic, casters, or other device that facilitates movement. In some embodiments the support base 150 is a fixed height. In some embodiments the support stand 150 can rotate about its vertical axis. The rotation may be up to 360°. This allows the barbeque assembly 100 to rotate without moving the base 156 of the support stand 150. In some embodiments the engagement region 152 can be locked in place so that the bottom housing 40 does not rotate.

In some embodiments, the bottom housing 40 of the barbeque 100 is pivotably mounted to the stand 150 to allow the bottom housing 40, grill, etc., to be tilted with respect to the stand 150. The ability to tilt the bottom hosing 40 with respect to the stand allows the user to keep the bottom housing 40 and grill substantially horizontal when the stand 150 is placed on a non-horizontal surface. In addition, the bottom housing 40 may be center mounted to the stand 150 such that the stand 150 is positioned at or near the center of the bottom housing 40. Center mounting allows the bottom housing 40 to be rotated with respect to the stand 150.

The engagement interface 152 is configured to fit within the support stand mount 90 The engagement interface 152 has a plurality of mounts (not shown) that are configured to engage a screw, bolt, quick disconnect, or other engagement apparatus that functions to couple the support stand 150 to the bottom housing 40. The engagement mounts (not shown) align with the mounting tabs 96.

In another embodiment, the support stand is a table mounted support stand. The table mounted support can smaller and configured to mount on a table top or other surface. For example, the support can be about 6", 12" or 18" tall. The table mounted support can utilizes the same bottom housing engagement interface as the floor mounted stand and may be vertically adjustable. The table mounted configuration can improve accessibility and usability for persons with physical disabilities.

The stand 150 allows complete adjustability of the barbeque housing and gills. For example, one the stand 150 is placed at the desired location, the housing 40 may be raised or lowered, rotated and/or tilted with respect to the stand 150. Furthermore, the stand 150 provides only a single point of contact for support between the stand 150 and the housing 40. The barbeque unit is balanced with respect to the stand 150 such that the housing 40 only has a single "leg" (e.g., the stand 150), instead of the typical four-leg or three-leg support found on most grills. The single-leg support allows the user to easily adjust not only the barbeque height, but also allows the barbeque to be easily rotated, swiveled, and tilted, to the right or left, clockwise or counterclockwise, with respect to the stand 150.

Grill

FIG. 1 illustrates an embodiment of a grill 144 for use with the barbeque assembly 100. The grill is configured in a repeating pattern of parallel slats or bars 146 that are connected by a plurality of perpendicular slats or crossbars 148. The pattern of slats 146 and crossbars 148 creates openings in the grill 144 for the flames and heat to come up from the burners 130, and allows grease drippings to fall through the grill 144 and into the bottom housing 40. The grill 144 may be formed from stainless steel, aluminum or other material. The grill can be mounted on grill shelves 56.

FIGS. 20 and 21 illustrate another embodiment of a grill 244. In this embodiment the grill 244 is formed from treated glass, ceramic, ceramic glass, metal or other material that is suitable for cooking. The grill 244 has a solid base 248 and a repeating pattern of parallel slats 246. There are no openings in the grill 244 to the interior portion of the bottom housing 40. In other words, the grill is substantially solid, having no passages through its entire wall thickness. The grill 144 can be formed from a glass ceramic with low thermal expansion, such as Schott ROBAX®.

During operation of the barbeque, the grill is heated 244 by the gas chamber covers 130. The grill 244 prevents grease drippings or other food from falling into the bottom housing 40 and onto the gas chamber covers 130, which is instead collected in the valleys formed by the slats 246. The grill can be easily removed for cleaning. In some embodiments, the grill 244 is configured such that its shape and geometry improve heat intensity by directing or focusing energy to desired locations. For example, the ceramic glass and the parallel slat geometry 246 can function as an infrared grill, by optically focusing energy to the grill's cooking surface. Indeed, in some embodiments the heat intensity is increased by approximately 20% over conventional grills. Additionally, infrared grilling uses less fuel and produces a smaller carbon footprint on the environment. For example, an infrared barbeque can use 40% less gas and have a 40% smaller carbon footprint.

Lid

FIGS. 1 through 3 illustrate an embodiment of the lid 102. The lid 102 of the barbeque is shaped and configured as shown. The lid 102 has two mounts 104 that have corresponding mounts 52 on the bottom housing. The mounts 104 are used to couple the lid 102 to the bottom housing 40. The lower edge of the lid 102 matches the curvature of the bottom housing 40. The matching curvature ensures a good fit between the lid 102 and bottom housing 40. The lid 102 rotates about the mounts 104. Preferably the lid is configured to rotate to a specific point. For example the stop may prevent the lid 102 from rotating beyond the position shown in FIG. 1. In some embodiments an upper grill rack may be coupled to the lid 102. In another embodiment, the lid 102 has a glass viewing area. In some embodiments, the entire lid 102 is formed of a transparent material, such as an heat insulating glass. A user can view the interior portion 48 of the barbeque through the viewing area. In some embodiments the entire lid can be formed from a transparent material. In some embodiments, the glass use to form the viewing window or the lid 102 is constructed from a low thermal expansion glass, such as Pyrex®.

Side Mount Accessories

The barbeque assembly 100 may include trays or accessories mounted to the sidewalls 44 of the bottom housing 40. The trays can be mounted to the bottom housing 40 via the grooves 54. Preferably, the trays or accessories have a standardized engagement interface for mounting to the grooves 54. The accessories engage the grooves 54 and slide into position within the bottom housing 40, thereby coupling the accessory to the bottom housing 40. In some embodiments, the sidewall 44 does not have grooves 54 and the sidewall 44 has another engagement interfaces, such as a series of slots on the outer ledge 58. The accessories may be configured to match the outer curvature of the sidewall 44. The side mount accessories can include trays, burners, containers, and other accessories.

Bottom Housing Assembly

Figure 15:
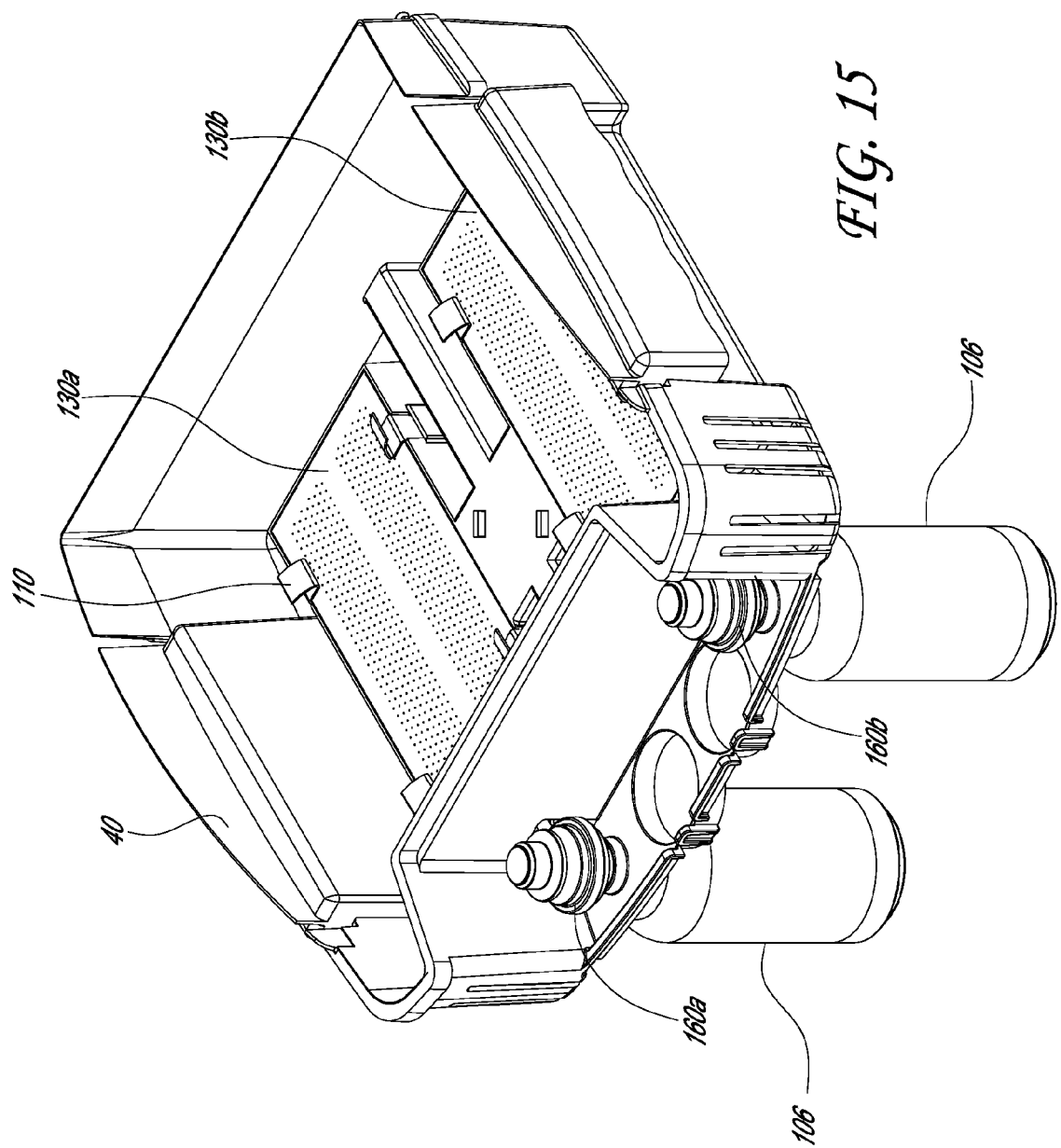
FIG. 15 is an assembly view of the bottom housing.
Figure 16:
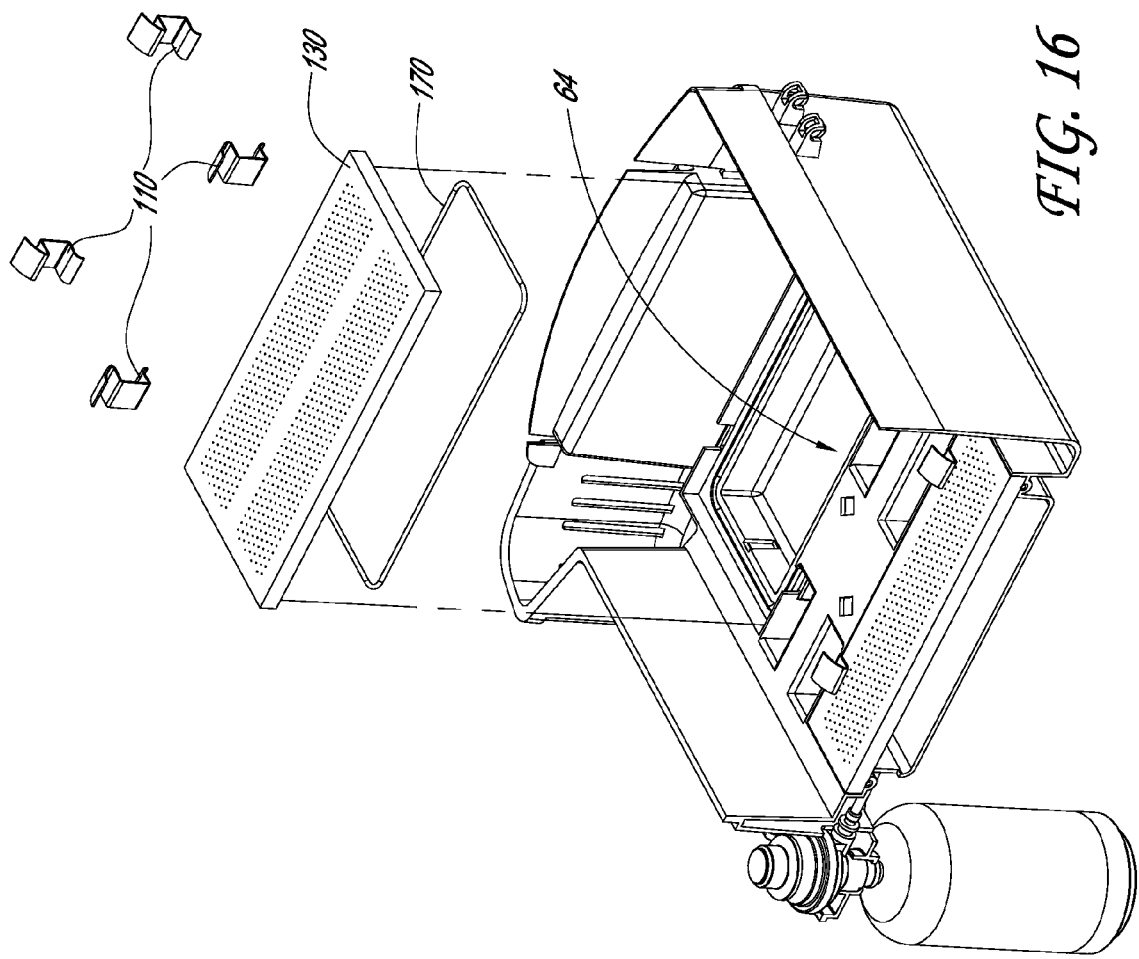
FIG. 16 is an exploded view of the gas chamber cover assembly from FIG. 16.

An embodiment of the bottom housing assembly 180 is illustrated in FIGS. 15 and 16. The bottom housing assembly includes the bottom housing 40, the grill 144 (not shown), regulators 160, fuel tanks 106, gaskets 170, gas chamber cover 130, and a plurality of retention clips 110. The burner chamber 64 may be formed as part of and integral with the bottom housing 40.

The regulator and burner chamber assembly follows the same general procedure for the first and second chambers 64a-b. The gasket 170 is coupled to the groove 70 on the burner chamber shelf 68. The gasket 170 may be coupled to the groove 70 using a thermally resistant adhesive. Preferably the gasket 170 is sufficiently secured so that it does not shift during operation of the barbeque. Preferably, the gasket 170 and groove 70 are configured so that when the gasket 170 is coupled to the groove 70 a portion of the gasket 170 extends above the burner support 68. Preferably the portion of the gasket that extends above the shelf is substantially uniform in height. The gasket 170 and groove 70 may have different cross sectional shapes and sizes than those shown in this embodiment. The height that the gasket 170 extends above the groove can vary. In some embodiments the shelf 68 may not have a groove and a gasket may be mounted directly on the burner support 68 of the burner chamber.

Each retention clips 110 is inserted into a retention clip opening 76 in the burner chamber 64. The retention clip 110 is manipulated so that the foot portion 122 and the lower compression surface 118 are positioned on the underside of the bottom housing 41 and adjacent the outer surface of the burner chamber 64. The retention clip 110 is not secured into this position and is free to move about. In this position the retention clip 110 does not interfere with the initial positioning of the gas chamber cover 130 above the burner chamber 64.

A gas chamber cover 130 is inserted into the burner chamber 64 and above the shelf 68. A cross-section of the gas chamber cover 130 positioned within the burner chamber 64 is illustrated in FIG. 17. The gas chamber cover 130 is configured to fit substantially within the outer chamber wall 66. The gas chamber cover 130 is positioned such that it is supported by and rests on the gasket 170. Preferably the bottom face 142 of the gas chamber cover 130 is in contact with the gasket 170 and not in contact with the shelf 68. Preferably there is a gap between the bottom face 142 and the burner support 68. Preferably there is another gap between the outer edge 139 of the gas chamber cover 130 and the outer chamber wall 66. Portions of the outer edge 139 of the gas chamber cover 130 may contact the outer chamber wall 66. Preferably the thickness 134 of the gas chamber cover 130 is such that the top surface 140 of the gas chamber cover 130 is at substantially the same height as the top edge of the burner chamber 64. The gas chamber cover 130 is secured to the burner chamber 64 using only hand installed clips 110; no screws or tools are utilized. Removal of the gas chamber cover 130 is easily accomplished by following the reverse procedure. For example, releasing the clips 110 by pulling their top portions towards the center of each respective burner chamber 64. Once the clips 110 are released, the gas chamber cover 130 is removed and the entire assembly may be cleaned. For example, in one embodiment, the lid 102, the grills 144, the gas chamber covers 130, the stand 150, regulators 160 and tanks 106 are removed from the bottom housing 40, and the bottom housing, 40, lid 102, grill 144, and possibly other parts, may be placed inside of a standard dishwashing machine for cleaning, as discussed in greater detail below.

After the gas chamber cover 130 is positioned within the burner chamber 64, the retention clips 110 secure the burner 130 within the burner chamber 64. Each retention clip is manipulated so that the upper compression surface 116 is adjacent the top surface 140 of the burner 130 and the lower compression surface 118 is adjacent the underside of the bottom housing 41. The clips 110 can be manipulated into position by applying an upward force on the handle portion 120 of the clip 110. The foot portion 122 and the lower compression surface 118 are relatively constrained by their position on the underside of the bottom housing 41, as such, an upward force applied to the handle portion 120 causes the gap between the lower compression surface 118 and the upper compression surface 116 to expand. The expansion allows the upper compression surface 116 to be moved into position onto the top surface 140 of the ceramic gas chamber cover 130. The gas chamber cover 130 is secured when the upper compression surface 116 is positioned substantially on the top surface 140 and the lower compression surface 118 is positioned substantially on the underside of the bottom housing 41, as illustrated in FIG. 17. The upper compression surface 116 works in conjunction with the lower compression surface 118 to hold the gas chamber cover 130 in place. Specifically, the upper compression surface 116 applies a downward force on the top surface 140 and the lower compression surface 116 applies an upward force on the underside of the bottom housing 41. The compression forces applied to the ceramic gas chamber cover 130 secure the gas chamber cover 130 within the burner chamber 64. Preferably the forces asserted by the retention clips cause the gas chamber cover 130 to slightly compress the gasket 170, thereby forming a seal between the bottom surface 142 and the gasket 170. Preferably the seal formed between the gasket 170 and the bottom surface 142 is sufficient to prevent gas from flowing out the edges of the gas chamber cover 130 during operation. Each clip 110 is secured following substantially the same procedure and provides substantially the same downward force on the gas chamber cover 130. Compression of the gasket causes the size of the gap between the bottom surface 142 and the burner shelf 68 to decrease. Preferably there is still a gap between the bottom surface 142 and the shelf 68 after the clips 110 have been secured to the burner chamber 64. The gas chamber cover 130 may shift laterally and horizontally from its original position, resulting in portions of the gas chamber cover 130 contacting the outer chamber wall 66. Preferably, there is a still a gap between a substantial portion of the outer edge 139 and the outer chamber wall 66. The clips 110 may be unsecured by applying an upward force to the handle portion 120 and moving the upper compression region 116 off of the gas chamber cover 130.

Regulator Assembly

Figure 18:
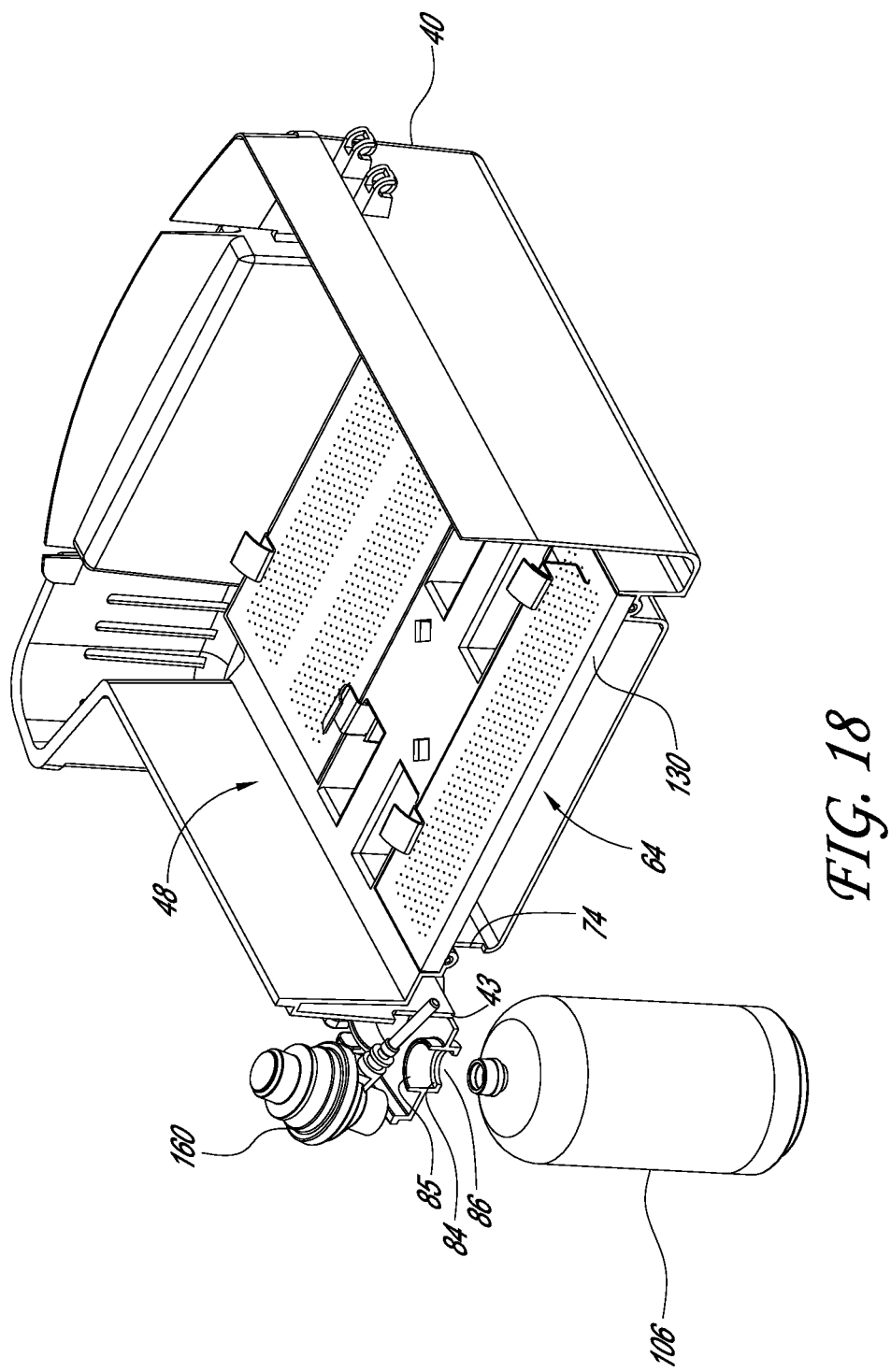
FIG. 18 is an exploded view of the regulator and fuel supply assembly from FIG. 15.
Figure 19:
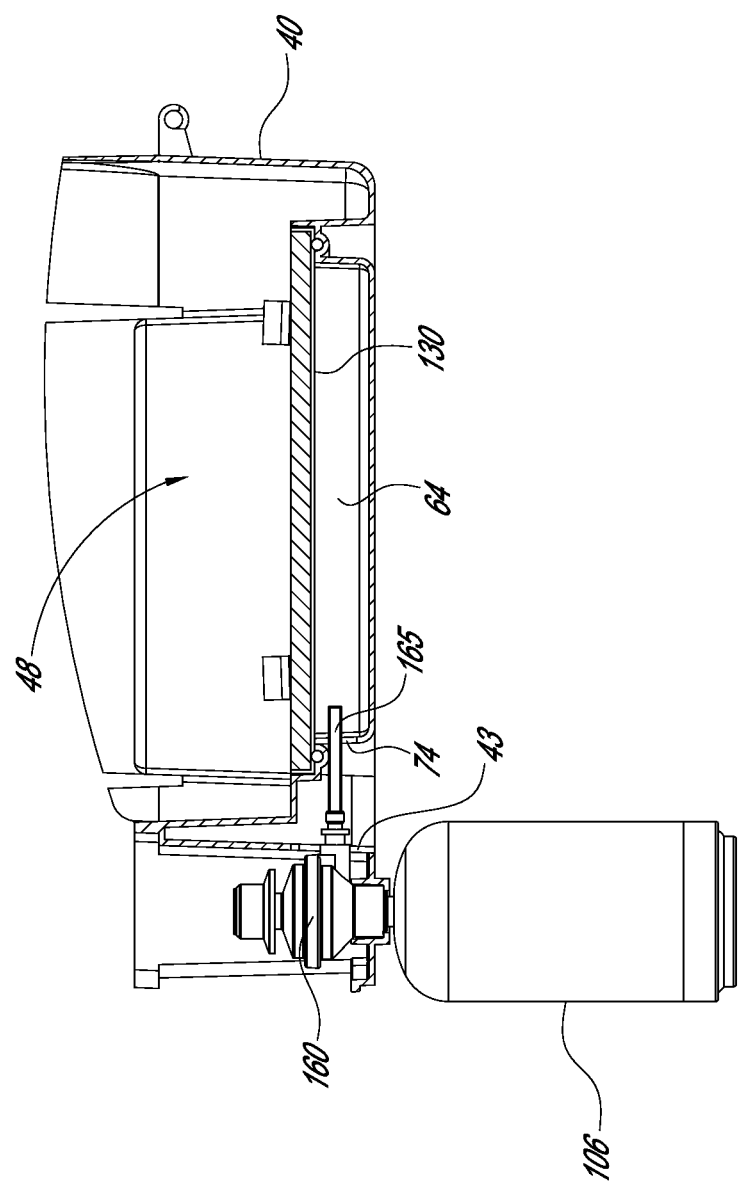
FIG. 19 is a section view of the bottom housing assembly showing the regulator and fuel supply assembly from FIG. 15.

FIGS. 18 and 19 illustrate the assembly of the regulator 160 and fuel tank 106 and attachment to the bottom housing 40. The regulator assembly includes a regulator 160 and a fuel tank 106. The regulator 160 is positioned by inserting a gas outlet stem 165 through an opening 43 in the front wall 42 and through the fuel supply opening 74 in the burner chamber 64. The outlet stem 165 is constructed so that the tip of the outlet stem 165 extends into the burner chamber 64. In some embodiments the burner chamber opening 74 may have an elastomeric membrane or seal with an opening for the outlet stem 165. The outlet stem 165 can be inserted through the seal and into the burner chamber 64, which can elastically deforms around the outlet stem 165 and substantially seal the burner chamber 64 from ambient air. In some embodiments the seal may not prevent all ambient air from entering or exiting the burner chamber 64. In other embodiments, the seal is omitted. The length of the outlet stem 165 can vary, in some embodiments it may extend only partially into the burner chamber 64 and in other embodiments it may extend substantially into the burner chamber. For example, in some embodiments the stem 165 extends into the middle of the burner chamber. In other embodiments, the stem 165 extends a predetermined distance past the opening 74, such as about 0.5", 1", 2", or 6" beyond the opening 74.

The manifold body 161 is positioned within the regulator housing 82 with the base of the fuel tank interface 169 resting on the regulator support lip 84. The fuel tank 106 is inserted through the bottom opening 86 of the regulator housing 82 and coupled to the regulator 160. For example, in one embodiment, the fuel tank 106 is screwed into the fuel tank interface 168. The gas inlet 166 is inserted into the fuel tank 106 and forms a fluid connection between the fuel tank 106 and regulator 160. As the fuel tank 106 is rotated and secured to the regulator 160, the regulator 160 and fuel tank 106 are tightened and secured to each other on opposite sides of the tray 80. The position of the regulator 160 and tank 106 may be fixed with respect to the tray 80 by attaching the tank 106 to the regulator 160 with the tray 80 positioned between them, for example, as shown in FIG. 19. Once the regulator 160 and tank 106 are attached to each other, they are secure and do not move with respect to the tray 80 or other parts of the barbeque housing. In one embodiment, the regulator 160 and tank 106 may be removed from the tray 80 only after the tank 106 is decoupled from the regulator 160.

In one embodiment, the regulator 160 is initially positioned by sliding outlet stem 65 into the burner chamber 64 through the opening 74. When positioned in this manner, the regulator 160 rests on the shelf 80. The regulator 160 may be secured in place by attaching the fuel tank 106 to the regulator 160. The fuel tank 106 serves as a lock to prevent movement or removal of the regulator 160.

The flow of fluid through the manifold 161 is controlled by a regulator control knob 162. The regulator control knob 162 opens and closes the fluid passage. When the fluid passage is open, fuel flows from the fuel tank to the burner chamber 64. The weight of the fuel tank 106 is supported by the regulator support lip 84. In some embodiments a gas line may be connected to the regulator. In this embodiment each regulator 160 has an independent fuel supply. In some embodiments a single fuel source may be connected to the first and second regulators 160*a*-*b*. Each regulator 160*a*-*b* independently and separately controls the fuel supplied to each burner chamber 64*a*-*b*.

Each regulator control knob 162 is mounted in a substantially horizontal plane such that they each rotate about a substantially vertical axis. This unique mounting allows the operator better visibility of the regulator setting (e.g., low, medium, high heat, etc.) when viewed from above.

The present configuration and front-style tank loading allow unique quick-connection and disconnect and removal of each fuel tank 106 and regulator 160 from the barbeque assembly. Further the assembly process does not utilize screws or similar fasteners. Indeed in many embodiments, no tools are used to assembly the barbeque assembly or to attach or remove the fuel tanks 106 and regulators 160. This further provides simplicity in assembly and operation, and disassembly for efficient and complete cleaning.

Barbeque Assembly

The support stand 150 is coupled to the bottom housing 40. The table mounted and floor mounted support stands couple to the bottom housing the same general methodology. The engagement interface 152 of the support stand 150 is inserted into the mount 90 in the bottom housing 40. The mounting tabs 96 on the bottom housing 40 are aligned with engagement mounts on the support stand 150. The appropriate hardware is inserted through the mounting holes 92, the engagement mounts, and mounting tab holes 98 and secured into place. For example, in one embodiment, quick release pins are used to secure the support stand 150 to the bottom housing 40. Preferably the bottom housing 40 is securely mounted on the support stand 150 such that it does not rock or tilt. Preferably, the bottom housing 40 is substantially level and stable after being secured to the support stand 150. After the bottom housing 40 has been secured to the support stand, the housing can be moved and positioned as needed. In some embodiments, the support stand may have a vertical height adjustment, which allows the height of the bottom housing 40 to be adjusted after the support stand 150 and the bottom housing 40 are coupled together. By adjusting the height the support stand 150, the height of the grilling surface may be adjusted to an appropriate height. In some embodiments, the bottom housing 40 can rotate about the vertical axis of the support stand 150.

The lid 102 is coupled to the bottom housing 40 by mounts 52 on the bottom housing 40 and mounts 104 on the lid 102. The mounts 52 and mounts 104 are coupled together using appropriate hardware. The hardware may be a quick release pin that allows the lid 102 to be easily and quickly attached and detached from the bottom housing. The hardware may also limit range of rotation of the lid 102 relative to the bottom housing 40. Preferably the lid 102 rotates until the bottom edge of the lid 102 is approximately vertical, as shown in FIG. 1. In some embodiments an upper grill surface may be couple to the lid and the bottom housing.

Barbeque Operation

The barbeque assembly 100 functions by supplying fuel to the burner chamber 64 and combusting the fuel in the interior or grill area 48 of the bottom housing 40. The combusting fuel heats the grill area 48 and cooks food on the grill 144. The supply of fuel to the burner chamber 64 is controlled by the regulator 160. The fuel flows along a fluid passage from the fuel tank 106, to the regulator 160, and out the gas outlet stem 165 to the burner chamber 64. The fuel flows through the plurality of holes 132 in the gas chamber cover 130 and into the grill area 48. The fuel is ignited substantially on the top surface 140 of the gas chamber cover 130. For example, the user may ignite the fuel by opening the regulators and dropping a lit match through the grate and onto the gas chamber cover 130. The control of fuel through the first and second gas chamber cover 130*a-b* is independently controlled by the first and second regulators 160*a-b*. The combusting fuel raises the temperature of the grill area 48 to a sufficient temperature for preparation of meat and other foods. The geometry and shape of the gas chamber cover 130 allows the gas to be evenly is dispersed over a much larger area than a typical barbeque burner. For example, the flame area (e.g., the area in which a flame is formed) will substantially match the area of the gas chamber cover 130 and grills.

The front air inlets 62 can provide additional ambient air to the grill area 48. Negative pressure created by the combusting fuel can cause ambient air to be brought in through the air inlets.

As the temperature heats up the different components of the barbeque 100, each component can thermally expand and contract. Different rates of thermal expansion and contraction of the separate components can cause stresses. The barbeque 100 compensates for the effects of thermal expansion and contraction by removing rigid couplings between the components that can detrimentally affect the life of the components. Different components with different material properties expand and contract in different amounts and at different temperatures. For example, the thermal expansion and contraction of a ceramic gas chamber cover 130 is different than the thermal expansion and contraction properties of aluminum. Rigid connections and couplings between ceramic and aluminum components can cause the components to separate, crack, and deteriorate over time. As such the barbeque 100 utilizes a system that can help to account for differences in the thermal characteristics of the different components. Specifically the gas chamber cover 130 are suspended within the burner chamber 64 such that the gas chamber cover 130 is not in substantial contact with the burner chamber 64 or bottom housing 40. The ceramic gas chamber cover 130 rests on the gasket 170 and there is a gap between the bottom surface 118 and the burner chamber shelf 68 and a gap between the outer edge 139 of the ceramic gas chamber cover 130 and the wall of the burner chamber 66. The ceramic gas chamber cover 130 are secured into place by the retention clips 110. The gap between the bottom surface 118 and the shelf 68 and the gap between the outer edge 139 and the wall of the burner chamber 66 allows the gas chamber cover 130 to shift and move when thermal expansion and contraction occurs. Since it is not rigidly fixed into place, the gas chamber cover 130 will not be subject to stresses by being pressed up against the bottom housing that could contribute to the breakdown and failure of the gas chamber cover 130. Preferably the gas chamber cover 130 will shift in position as it comes in contact with burner chamber wall 66 rather than applying significant stress at the contact points to the bottom housing 40 and the gas chamber cover 130. As such, the spatial positioning of the gas chamber cover 130 relative to the burner chamber 64 is such that the thermal expansion and contraction of the burner chamber does not cause significant stresses to the gas chamber cover 130.

Over time grease drippings and other food drop down through the grill 144 onto the bottom housing 40 and the gas chamber cover 130. The bottom housing 40 and gas chamber cover 130 can become dirty and needed to be cleaned to operate at optimal efficiency. Clogged burners can result in an uneven distribution of heat on the grill 144. However, the high temperatures reached by the gas chamber cover 130 typically carbonized such drippings to an easily-cleanable powder.

The barbeque 100 typically operates at temperatures at or near 1700° K. The barbeque 100 operates efficiently and provides the same level of heat as a traditional barbeque at approximately 40-50% less fuel consumption and 40-50% less carbon footprint. The high temperatures and high efficiency of the barbeque 100 allows for quicker food cooking and better tastes.

After use the ceramic burners and bottom housing can be easily and efficiently cleaned. The barbeque can be easily disassembled by following the reverse process of the assembly described above. The ceramic burners can be cleaned by scraping the burners down with a scraping tool.

The bottom housing 40 can be quickly and efficiently cleaned. Everything in the bottom housing 40 with the exception of the gasket can be decoupled and removed. After the bottom housing 40 has been disassembled, the entire bottom housing 40 can be placed in a dishwashing machine and cleaned. The bottom housing 40 is dishwasher safe and can be cleaned quickly and easily. Gas chamber covers are easily removable and cleanable, as well.

The embodiments set forth above are illustrative of inventive principles and features, and these principles may be applied to barbeque systems that have different constructions that doe not match the embodiment of the barbeque assembly illustrated in the Figures. For example the bottom housing may have additional burner chambers. The burners may have different sizes and shapes, circular burners. In other embodiments, the burners may be placed on top of the burner chambers and not within the burner chambers. As such, the principles and features discussed herein can be applied in embodiments of various shapes, sizes and configurations.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. Accordingly, Applicants contemplate that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A barbeque assembly for use in the preparation of cooked food comprising:
   a bottom housing having an internal grill area, the bottom housing comprising at least one side wall and a bottom wall, the bottom wall shaped to define one or more burner chambers, wherein each burner chamber forms a cavity and a chamber cover support in the bottom wall of the bottom housing, wherein each burner chamber has a fuel supply inlet and at least one retention element interface;
   one or more regulators, each regulator having a gas inlet and a gas outlet stem and defining a fluid flow path between the gas inlet and the gas outlet stem, wherein the regulator is operable to open and close the fluid flow path, wherein the regulator is configured to couple with a fuel supply, wherein the gas outlet stem is configured to be positioned within the fuel supply inlet to supply fuel to the burner chamber;
   one or more chamber covers, each chamber covers having a first face and a second face and a plurality of passageways extend from the first face through to the second face, wherein the chamber covers is configured to be positioned to at least partially cover the burner chamber and be supported by the chamber cover support, wherein each chamber cover is configured to allow fuel to flow from the burner chamber cavity through the plurality of passageways to the first face; and
   a plurality of retention elements, wherein each of the plurality of retention elements are configured to secure the at least a portion of the chamber cover within the bottom housing using the retention element interface.

2. The barbeque assembly of claim 1, further comprising one or more gaskets coupled to the one or more chamber cover supports, wherein the chamber cover is positioned adjacent the gasket, wherein the gasket is configured to compress when the retention elements hold the one or more chamber covers in place.

3. The barbeque assembly of claim 1, further comprising a support stand coupled to the bottom housing.

4. The barbeque assembly of claim 3, where in the bottom housing is rotatable about the support stand, wherein the support stand is configured to adjust the height of the bottom housing.

5. The barbeque assembly of claim 1, further comprising a lid rotatably coupled to the bottom housing.

6. The barbeque assembly of claim 5, wherein the lid comprises a glass window.

7. The barbeque assembly of claim 1, further comprising a grill coupled to the bottom housing, wherein the grill has a plurality of slats and a plurality of crossbars that form a plurality of holes.

8. The barbeque assembly of claim 1, further comprising a grill formed of ceramic glass, wherein the grill comprises a solid base and a plurality of slats.

9. The barbeque assembly of claim 1, wherein the bottom housing is formed from a single piece of material.

10. The barbeque assembly of claim 9, wherein the bottom housing is formed of injection molded aluminum.

11. The barbeque assembly of claim 1, wherein the bottom housing is formed from more than one piece of material.

12. The barbeque assembly of claim 1, wherein the gas chamber cover comprises ceramic.

13. The barbeque assembly of claim 1, wherein each retention element comprises a clip having a first compression surface and a second compressions surface, wherein a spacing between the first compression surface and the second compression surface is larger than the thickness of the gas chamber cover.

14. The barbeque assembly of claim 1, wherein the bottom housing further comprises a plurality of air inlets.

15. The barbeque assembly of claim 1, further comprising at least one accessory tray coupled to the bottom housing.

16. The barbeque assembly of claim 1, wherein the bottom housing is configured to be washable in a dishwasher.

17. The barbeque assembly of claim 1, wherein the plurality of passageways are substantially distributed over the entire surface of the gas chamber cover, and configured such that fuel supplied to the burner chamber is evenly distributed about the entire first face of the gas chamber cover.

18. A method of operating a barbeque system for the preparation of cooked food, comprising:
   providing a bottom housing having an interior chamber, the bottom housing comprising at least one side wall and a bottom wall, the bottom wall shaped to define a burner chamber, wherein the burner chamber forms a cavity in the bottom wall of the bottom housing, wherein the burner chamber has a fuel supply opening and a burner chamber cover support, wherein a gasket is coupled to the burner chamber cover support;
   positioning a burner chamber cover having a plurality of passageways extending from a top surface of the burner chamber cover to a bottom surface of the burner chamber cover within the burner chamber and adjacent the gasket, wherein the top surface of the burner faces the interior chamber and the bottom surface of the burner faces the burner chamber;
   supplying fuel to the burner chamber, wherein the fuel flows into the burner chamber and through the plurality of passageways, wherein the fuel flows from the bottom surface of the burner chamber cover to the top surface of the burner chamber cover;
   combusting fuel that flows out of the top surface of the burner chamber cover within the interior chamber and substantially at the top surface of the burner chamber cover.

19. The method of claim 18, further comprising securing the burner chamber cover to the burner chamber with at least one burner retention member, wherein said securing causes the gasket to compress.

20. A barbeque assembly that does not include a separate, removable burner, the barbeque assembly comprising:
   a bottom housing, the bottom housing comprising at least one side wall and a bottom wall, the bottom wall shaped to define a gas collection cavity and a cavity cover support positioned above the gas collection cavity, the bottom wall having a gas inlet and at least one retention clip opening;
   an o-ring positioned around an opening to the gas collection cavity and supported by the cavity cover support;

a cavity cover positioned in contact with the o-ring and at least partially covering the gas collection cavity; and at least one retention clip having a upper and lower extension portions, wherein the lower extension portion is sized to fit within the retention clip opening, and wherein the upper and lower extension portions are sized and spaced from each other sufficiently to retain the cavity cover against the o-ring, covering the gas collection cavity.

* * * * *